(12) United States Patent
Saurabh et al.

(10) Patent No.: US 10,445,311 B1
(45) Date of Patent: Oct. 15, 2019

(54) ANOMALY DETECTION

(71) Applicant: Sumo Logic, Redwood City, CA (US)

(72) Inventors: Kumar Saurabh, Sunnyvale, CA (US); David M. Andrzejewski, San Francisco, CA (US); Yuchen Zhao, San Mateo, CA (US); Christian Friedrich Beedgen, Mountain View, CA (US); Bruno Kurtic, San Mateo, CA (US)

(73) Assignee: Sumo Logic, Redwood City, CA (US)

( * ) Notice: Subject to any disclaimer, the term of this patent is extended or adjusted under 35 U.S.C. 154(b) by 240 days.

(21) Appl. No.: 14/318,409

(22) Filed: Jun. 27, 2014

Related U.S. Application Data

(60) Provisional application No. 61/876,722, filed on Sep. 11, 2013, provisional application No. 61/920,312, filed on Dec. 23, 2013.

(51) Int. Cl.
*G06F 16/23* (2019.01)

(52) U.S. Cl.
CPC .............................. *G06F 16/2365* (2019.01)

(58) Field of Classification Search
CPC .................................................. G06F 16/2365
USPC .................... 707/706, 722, 736, 758, 781
See application file for complete search history.

(56) References Cited

U.S. PATENT DOCUMENTS

| | | | |
|---|---|---|---|
| 6,502,133 B1 | 12/2002 | Baulier et al. | |
| 7,376,752 B1 | 5/2008 | Chudnovsky et al. | |
| 7,472,422 B1 * | 12/2008 | Agbabian | 726/25 |
| 7,539,656 B2 | 5/2009 | Fratkina et al. | |
| 7,930,546 B2 | 4/2011 | Rhoads et al. | |
| 8,032,489 B2 | 10/2011 | Villella et al. | |
| 8,370,445 B2 | 2/2013 | Brabec et al. | |
| 8,380,630 B2 | 2/2013 | Felsher | |
| 8,495,429 B2 | 7/2013 | Fu et al. | |
| 9,262,519 B1 | 2/2016 | Saurabh et al. | |
| 9,336,385 B1 * | 5/2016 | Spencer | H04L 63/1441 |
| 2003/0145083 A1 | 6/2003 | Cush et al. | |
| 2004/0143403 A1 | 4/2004 | Brandon et al. | |
| 2004/0117648 A1 | 6/2004 | Kissel | |
| 2004/0165767 A1 * | 8/2004 | Gokturk et al. | 382/159 |
| 2004/0215430 A1 | 10/2004 | Huddleston et al. | |
| 2004/0230572 A1 | 11/2004 | Omoigui | |
| 2005/0060643 A1 | 3/2005 | Glass et al. | |
| 2006/0015824 A1 | 1/2006 | Chrysanthakopoulos | |
| 2007/0143827 A1 | 6/2007 | Nicodemus et al. | |
| 2007/0179987 A1 | 8/2007 | Lim | |

(Continued)

OTHER PUBLICATIONS

Anup K. Ghosh, Aaron Schwartzbard, and Michael Schatz. "Learning Program Behavior Profiles for Intrusion Detection." In Workshop on Intrusion Detection and Network Monitoring, vol. 51462, pp. 1-13. 1999.

(Continued)

*Primary Examiner* — Syling Yen
(74) *Attorney, Agent, or Firm* — Van Pelt, Yi & James LLP

(57) ABSTRACT

Analyzing log data, such as security log data and machine data, is disclosed. A baseline is built for a set of machine data. The baseline is built at least in part by determining a plurality of signature profiles for a plurality of respective time slices. An occurrence of an anomaly associated with the source of the machine data is determined. The occurrence is determined at least in part by determining that received machine data does not conform to the baseline within a threshold.

27 Claims, 31 Drawing Sheets

(56) References Cited

U.S. PATENT DOCUMENTS

| | | | |
|---|---|---|---|
| 2009/0099988 A1* | 4/2009 | Stokes | G06F 15/16 |
| | | | 706/20 |
| 2009/0125445 A1 | 5/2009 | Mousavi et al. | |
| 2009/0172688 A1 | 7/2009 | Bobak et al. | |
| 2009/0113246 A1 | 8/2009 | Sabato et al. | |
| 2009/0265609 A1 | 10/2009 | Rangan et al. | |
| 2010/0024012 A1 | 1/2010 | Devine et al. | |
| 2010/0066540 A1 | 3/2010 | Theobald et al. | |
| 2010/0153316 A1* | 6/2010 | Duffield | G06F 21/552 |
| | | | 706/12 |
| 2010/0210240 A1 | 8/2010 | Mahaffey et al. | |
| 2011/0185234 A1 | 7/2011 | Cohen et al. | |
| 2011/0282908 A1 | 11/2011 | Fly et al. | |
| 2011/0296244 A1* | 12/2011 | Fu et al. | 714/37 |
| 2012/0070091 A1 | 3/2012 | Saund | |
| 2012/0124047 A1 | 5/2012 | Hubbard | |
| 2012/0209539 A1* | 8/2012 | Kim | 702/41 |
| 2012/0246303 A1 | 9/2012 | Petersen et al. | |
| 2012/0259938 A1 | 10/2012 | Brabec et al. | |
| 2013/0159021 A1 | 6/2013 | Felsher | |
| 2013/0237204 A1 | 9/2013 | Buck et al. | |
| 2014/0344622 A1* | 11/2014 | Huang | G06F 11/079 |
| | | | 714/37 |

OTHER PUBLICATIONS

Yu Gu, Andrew McCallum, and Don Towsley. "Detecting anomalies in network traffic using maximum entropy estimation." In Proceedings of the 5th ACM SIGCOMM conference on Internet Measurement, pp. 32-32. USENIX Association, 2005.

* cited by examiner

```
{ "name": "CollectorMessage", "type": "record",
  "fields": [
            { "name": "messageId", "type": "long" },
            { "name": "bladeId", "type": "long" },
            { "name": "source", "type": "CollectorSource" },
            { "name": "encoding", "type": "string" },
            { "name": "messageTime", "type": "long" },
            { "name": "payloadSize", "type": "int" },
            { "name": "payload", "type": "bytes" },
            { "name": "count", "type": "int", "default": -1 }
            ]
}, { "name": "CollectorSource", "type": "record",
  "fields": [
            { "name": "name", "type": "string" },
            { "name": "host", "type": "string" },
            { "name": "category", "type": "string" }

SUMO LOGIC – COLLECTOR CONFIGURATION

Activation code: X4DG25   Re-activate this collector                    Sign Out Collector Name: | US West DC1 Servers | ~402

Tags: | West, DB, PII | ~404

Optional Context

Department: | Sales ▽ |    Regulations: | PCI DSS ▽ | ~410
                ~406
Function: | Customer PII hosting ▽ |    Data center: | US_WEST_DC_1 |
          ~406b Description: | Primarily linux servers hosting customer information databases including Oracle and MySQL instances. | ~408

[ Submit ]

FIG. 4

SUMO LOGIC – SOURCE CONFIG (ADD SYSLOG SOURCE)

Sign Out

Type: ● UDP ○ TCP — 502

Port: 514 — 504

Name: — 506

Tags (Optional): — 508

Optional Context

Source Type: — 510
Firewall
IDS / IPS
Routers
UNIX / Linux
...

Source Vendor: — 512
Cisco
Juniper
Sourcefire
...

Version:

Department: HR

Description:

Save

SUMO LOGIC – SOURCE CONFIG (ADD FILE/DIRECTORY SOURCE) | Sign Out

Path: /var/log/*.log    [File Chooser] — 602
Unix or Windows syntax accepted. You may also use the File Chooser. Specify a single path (e.g., /var/log/my.log), directory path (e.g., /var/log/), or partial path (e.g., /var/log/*.log).
604

Host(s):
List hosts, separated by commas. If omitted, local collector host is assumed.

Name:

Tags (Optional):

Optional Context

Source Type:
  Firewall
  IDS / IPS
  Routers
  UNIX / Linux

Source Vendor:
  Cisco
  Juniper
  Sourcefire

Version:

Department: HR

Description:

[Save]

SUMO LOGIC – COLLECTOR MANAGEMENT (COLLECTOR LIST) | Sign Out

Available Collectors:

| Collector Name | Tags | Description | Status | On/Off | Delete | Clone |
|---|---|---|---|---|---|---|
| △ US West DC1 | West, PII | XXxxXX xxxXX | Running | STOP | 🗑 | 🗐 |
| ▽ US West DC2 | West, HR, ERP | XXxxXX xxxXX | Stopped | ▲ | 🗑 | 🗐 |

| Source Name | Tags | Type | Details | Status | Description |
|---|---|---|---|---|---|
| Linux Srv 1 | HR | Remote tail | /var/log/*.log | Running | xXxxXXxXxxxX |
| Firewall 1 | Perimeter | Syslog | UDP | Running | xXxxXXxXxxxX |
| VPN | Perimeter | Syslog | TCP | Stopped | xXxxXXxXxxxX |

} 324

| △ US East DC1 | East, Testing | XXxxXX xxxXX | Running | STOP | 🗑 | 🗐 |

[ + Add New ]

```
Oct 27 10 57 16 HOST123 60d01h10m52s I STP VLAN 1 Port 16 STP State > LISTENING (MakeFwding)
Oct 27 10 57 16 HOST123 60d01h36m45s I STP VLAN 1 Port 16 STP State > DISABLED (PortDown)
Oct 27 10 57 16 HOST123 59d10h17m40s I STP VLAN 1 Port 6 STP State > DISABLED (PortDown)
Oct 27 10 57 16 HOST123 59d06h32m21s I STP VLAN 1 Port 2 STP State > LEARNING (FwdDlyExpiry)
                                                .
                                                .
Oct 27 10 52 33 HOST123 58d05h17m40s I STP VLAN 1 Port 4 STP State > DISABLED (PortDown)
```

FIG. 13A

```
\a+ \d+ \d+ \d+ HOST123 \d\dd\d\dh\d\dm\d\ds I STP VLAN 1 Port \d STP State >
(LISTENING \(MakeFwding\)|DISABLED \(PortDown\)| LEARNING \(FwdDlyExpiry\))
```

FIG. 13B 2012-31-05 00:02:02 Controller start command received.
2012-31-05 00:02:03 Time taken to start controller is 0.4 ms. ⟵1602
2012-31-05 00:02:04 Controller is idle.
2012-31-05 00:02:05 Controller is idle.
2012-31-05 00:02:06 Controller is idle.
2012-31-05 00:02:07 Controller stop command received. ⟵1604
2012-31-05 00:02:08 Time taken to stop controller is 0.3 ms. ⟵1606
...
2012-31-05 00:04:44 Time taken to start controller is 0.7 ms. ⟵1608
...
2012-31-05 00:11:22 Time taken to stop controller is 0.5 ms.

FIG. 16A

```
char timebuf[128];
strftime(timebuf, sizeof(timebuf), "%Y-%m-%d %H:%M:%S", now);
fprintf(logfile, "%s Time taken to %s controller is %.1f ms.", timebuf, actiontype, actiontime);
```
⟵1652

| Summarize | | | |
|---|---|---|---|
| Page: 1 of 1 ▲ ■ | | | |
| Count | Relevance ▼ | Actions | Signature |
| 36 | 5 | 👍 💬 ✂ ✏ | [hostId=tamalpais-1] INFO - JOB SUCCESS - computation ***** computed by computer tamalpais-1 |
| 27 | 5 | 👍 💬 ✂ ✏ | [hostId=tamalpais-1] INFO - ASSIGNING WORK - finding computers to compute computation |
| 15 | 5 | 👍 💬 ✂ ✏ | [hostId=mirrorlake-2] INFO - login attempt failed, identification code: unidentified |
| 15 | 5 | 👍 💬 ✂ ✏ | [hostId=govnelson-3] INFO - database starting up |
| 14 | 5 | 👍 💬 ✂ ✏ | [hostId=bigsur-*1] WARNING - database connection unstable |
| 10 | 5 | 👍 💬 ✂ ✏ | [hostId=govnelson-2] INFO - database shutting down |

FIG. 22B

| Summarize | | | |
|---|---|---|---|
| Page: 1 of 1 ▲ ■ | | | |
| Count | Relevance ▼ | Actions | Signature |
| 10 | 10 | 👍 💬 ✂ ✏ | [hostId=govnelson-2] INFO - database shutting down |
| 15 | 9.53 | 👍 💬 ✂ ✏ | [hostId=govnelson-3] INFO - database starting up |
| 14 | 9.53 | 👍 💬 ✂ ✏ | [hostId=bigsur-*1] WARNING - database connection unstable |
| 36 | 5 | 👍 💬 ✂ ✏ | [hostId=tamalpais-1] INFO - JOB SUCCESS - computation ***** computed by computer tamalpais-1 |
| 27 | 5 | 👍 💬 ✂ ✏ | [hostId=tamalpais-1] INFO - ASSIGNING WORK - finding computers to compute computation |
| 15 | 5 | 👍 💬 ✂ ✏ | [hostId=mirrorlake-2] INFO - login attempt failed, identification code: unidentified |

| Summarize | | |
|---|---|---|
| Page: 1 of 1 | | |
| Count | Relevance ▼ Actions | Signature |
| 10 | 10 👍 💬 ✂ ✏ | [hostId=govnelson-2] INFO - database shutting down |
| 15 | 9.53 👍 💬 ✂ ✏ | [hostId=govnelson-3] INFO - database starting up |
| 14 | 9.53 👍 💬 ✂ ✏ | [hostId=bigsur-*] WARNING - database connection unstable |
| 15 | 5 👍 💬 ✂ ✏ | [hostId=mirrorlake-2] INFO - login attempt failed, identification code: unidentified |
| 27 | 0.47 👍 💬 ✂ ✏ | [hostId=tamalpais-1] INFO - ASSIGNING WORK - finding computers to compute computation ***** |
| 36 | 0 👍 💬 ✂ ✏ | [hostId=tamalpais-1] INFO - JOB SUCCESS - computation ***** computed by computer tamalpais-1 |

Anomaly Dashboard > Anomaly Event — 2700

| Event Name | QueryCacheCleaner — 2706 | Description | Routine cleanup of query cache — 2708 |

Severity: ☐ Low — 2710

— 2702, 2704

Signatures  Page: |◁| [1] of 4 |▷| |▷▷|

| # | Score | Count | | |
|---|---|---|---|---|
| 1 | 270 — 2716 | new — 2718 | | |
| 2 | 0 | 2718 gone | | |
| 3 | 0 | −85% | | |
| 4 | 0 | 2722 gone | | |
| 5 | 0 | 0 — 2712 | | |

— 2718, 2720

Signature ⊗

$DATE INFO [hostID=nite-ftsearch-1] [module=STREAM] [localUserName=stream] [logger=stream_pipeline.scala.operators.until.ElementWriter] [thread=QueryCacheCleanerThread] ElementWriter closed. elementsCount=1

— 2714

Messages with this Signature  Page: |◁| |▽| [1] of 18 |△| |▷▷|

| 1 | 07/15/2013 12:20:50.357 | 2013-07-15 12:20:50,357 -0700 INFO [hostId=nite-ftsearch-1] [module=STREAM] [localUserName=stream] |
| 2 | 07/15/2013 12:20:50.340 | 2013-07-15 12:20:50,340 -0700 INFO [hostId=nite-ftsearch-1] [module=STREAM] [localUserName=stream] |

— 2724

# ANOMALY DETECTION

CROSS REFERENCE TO OTHER APPLICATIONS

This application claims priority to U.S. Provisional Patent Application No. 61/920,312 entitled REFINEMENT AND PERSONALIZATION OF LOG DATA ANALYSIS filed Dec. 23, 2013, and to U.S. Provisional Patent Application No. 61/876,722 entitled ANOMALY DETECTION filed Sep. 11, 2013, both of which applications are incorporated herein by reference for all purposes.

BACKGROUND OF THE INVENTION

Business and other entities are increasingly interested in capturing data associated with their computer networks for information technology (IT) security, IT operations, compliance, and other reasons. Unfortunately, analyzing that data can be difficult, expensive, and ineffective. One reason is that the data is voluminous and generated at a rapid rate. Another reason is that an increasing number of types of devices emit log information in varying and new formats. As new types of data are to be captured and analyzed, significant work is typically required from expert contractors. And, even with a dedicated team of analysts, it can be very difficult, if not impossible, for such analysts to identify potentially important events in the vast quantity of data.

BRIEF DESCRIPTION OF THE DRAWINGS

Various embodiments of the invention are disclosed in the following detailed description and the accompanying drawings.

FIG. 3 illustrates an example collector message format.

FIG. 4 illustrates an embodiment of a collector configuration interface as rendered in a browser.

FIG. 5 illustrates an embodiment of a source configuration interface as rendered in a browser.

FIG. 6 illustrates an embodiment of a source configuration interface as rendered in a browser.

FIG. 8 illustrates an embodiment of a collector management interface as rendered in a browser.

FIG. 13A illustrates a subset of entries in a log file.

FIG. 13B illustrates an example of a regular expression.

FIG. 16A illustrates a subset of entries in a log file.

FIG. 16B illustrates a portion of a C program.

FIG. 17 illustrates an embodiment of an interface as rendered in a browser.

FIG. 22A illustrates a portion of an interface as rendered in a browser.

FIG. 22B illustrates a portion of an interface as rendered in a browser.

FIG. 22C illustrates a portion of an interface as rendered in a browser.

FIG. 27 illustrates an embodiment of an anomaly dashboard interface as rendered in a browser.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
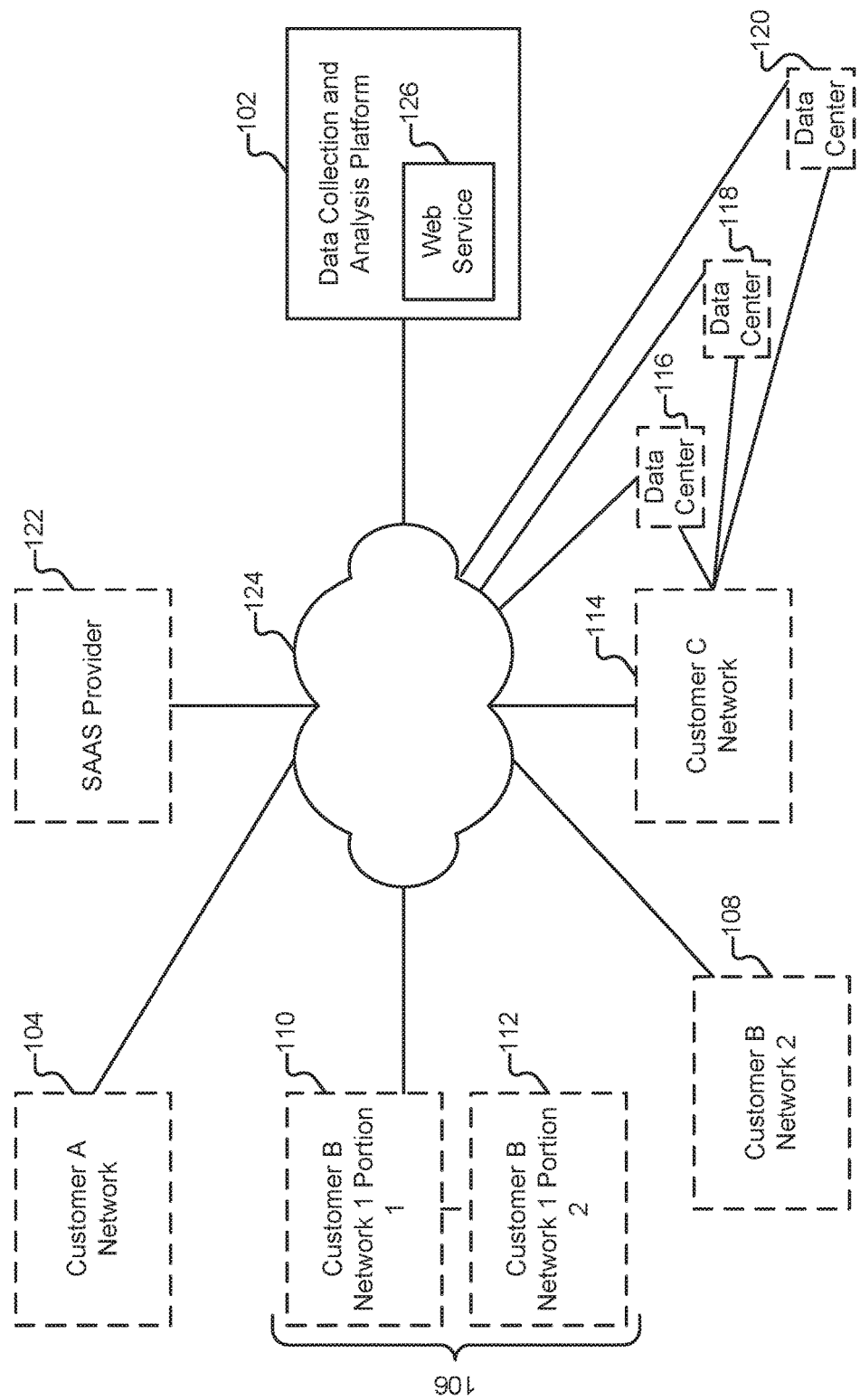
FIG. 1 illustrates an environment in which data, including machine data, is collected and analyzed.

FIG. 1 illustrates an environment in which data, including machine data, is collected and analyzed. In the example shown, three different customers (Customers A, B, and C) provide data to a data collection and analysis platform 102 (also referred to herein as "platform" 102) via network 124. Other elements may also provide data to platform 102, such as software-as-a-service provider 122 ("SAAS Provider" 122).

Customer A (also referred to herein as "Acme Company") maintains an enterprise network (104) at a single location. Included within the network are various desktop and laptop computers, commodity server-class hardware running various business applications and database software, and other devices typically deployed in an enterprise setting. As will be described in more detail below, data collectors can be installed within network 104 and configured to transmit data, including machine data, to platform 102. The collectors are also configured to receive information from platform 102, such as configuration and control messages.

Customer A also makes use of services offered by SAAS Provider 122. SAAS Provider 122 is configured to report information associated with Customer A (and others of its customers) to platform 102. In particular, SAAS Provider 122 can provide both in-application log information, as well as lower level information (such as failed login attempts against Customer A's accounts). Using the techniques described herein, data provided by Customer A, and data provided on behalf of Customer A by SAAS Provider 122 can both be ingested into platform 102 and correlated. Other types of providers can also be integrated into the environment shown in FIG. 1 such as platform-as-a-service (PAAS) and Infrastructure as a Service (IAAS) and the techniques described herein adapted accordingly. SAAS, PAAS, and IAAS providers are referred to collectively herein as "third party service suppliers."

Customer B (also referred to herein as "Beta Corporation") is significantly larger than Customer A and maintains networks in multiple physical locations. For example, Beta Corporation has one office in Singapore and another in Denver, each with respective networks (106, 108). Collectors installed at network 108 are configured to communicate with platform 102. Network 106 is subdivided into two portions—one of which (110) is allowed to communicate with nodes outside network 106, and one of which is not (112). In this scenario, collectors installed within network 112 communicate with collectors installed within network 110 (a process also referred to herein as "collector chaining"), which in turn communicate with platform 102.

Customer C (also referred to herein as "Cool Co.") is similar in size to Customer A. In addition to maintaining an enterprise network 114, Customer C also leases servers that are located at data centers 116-120. Collectors are installed in network 114 and at data centers 116-120 and all of the collectors communicate information with platform 102.

Platform 102 is illustrated as a single logical device in FIG. 1. As will be described in more detail below, platform 102 is a scalable, elastic architecture and may comprise several distributed components, including components provided by one or more third parties. Further, when platform 102 is referred to as performing a task, such as storing data or processing data, it is to be understood that a sub-component or multiple sub-components of platform 102 (whether individually or in cooperation with third party components) may cooperate to perform that task. In some embodiments, platform 102 is owned by or otherwise under the control of one of the parties described herein as being a customer (e.g., Customer B), or a partner, and use of the platform by other customers is omitted as applicable.

Figure 2:
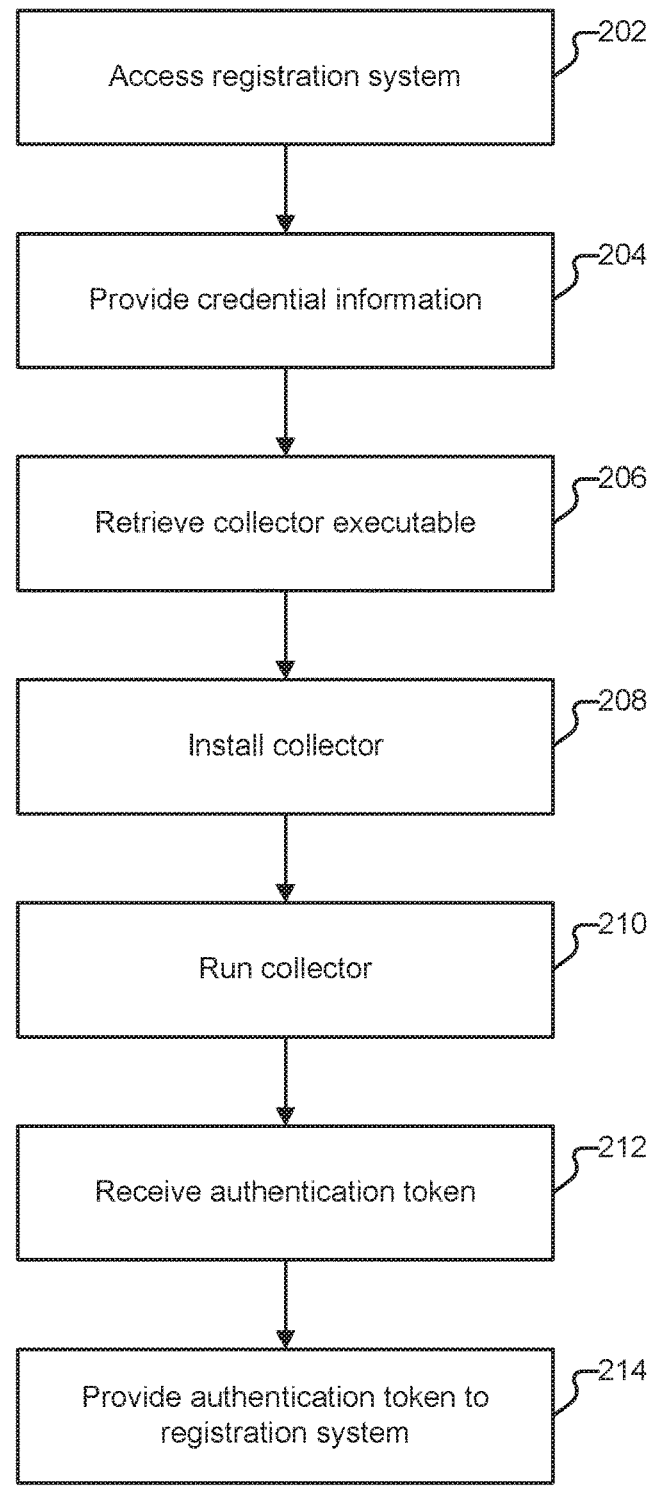
FIG. 2 illustrates an embodiment of a process for enrolling with a data collection and analysis platform.

FIG. 2 illustrates an embodiment of a process for enrolling with a data collection and analysis platform. In some embodiments the process shown in FIG. 2 is performed by an administrator, such as an administrator of network 104 (also referred to herein as "Alice"). The process begins at 202 when Alice accesses a registration system. As one example, at 202, Alice directs a web browser to a web interface provided as a service (126) by platform 102. At 204, Alice provides registration information, such as an email address and password, as well as information about Acme Company. Once Alice's registration information has been approved (e.g., after her email address has been verified), she will be presented with access to a collector executable (e.g., via a download page). Different versions of the collector executable exist for different operating systems. In particular, the application code can be wrapped with operating system specific techniques for installing services. For example, if Alice retrieves an executable (206) for a computer (e.g., her primary administrative console) running a Microsoft Windows operating system, the application will install itself in the Windows Service Manager. In the case of an Ubuntu Linux system, Alice would be instructed to copy an apt get.

At 208, Alice installs the collector. The retrieved collector can be, but need not be used on the computer with which Alice accesses the web interface to platform 102. For example, Alice may desire to install the collector on the Windows-based system but download the collector executable using the Linux-based system, a smartphone or tablet, or other appropriate device. As will be described in more detail below, collectors may be installed on a node to be monitored (e.g., a particular server) and may also be installed on a node that is in communication with a device to be monitored. For example, a collector may be installed on a server that is in communication with a router, printer, and/or other devices onto which a collector is not installed. One collector may collect data for a single device, but may also be configured to collect data from multiple devices, as applicable.

At 210, Alice runs the collector application. On first startup, the executable contacts web service 126 and requests an authentication code (received at 212). The executable instructs Alice to access the web interface using her browser and to enter as input to the collector application the authentication code (214), either via a GUI or via a command line, as applicable. In various embodiments, other credentials are used at portions 212 and 214 of the process. For example, an API key, a username and password, or combinations of credentials can be used as applicable.

As part of a successful registration, various records are created in databases maintained by platform 102. For example, an organization identifier is established for Acme Company and the collector is assigned an identifier that is associated with Acme Company's organization identifier. Other processes can also occur as part of a successful registration. For example, a credential can be generated and pushed to the collector by platform 102.

From an end-user viewpoint, once the authentication code is successfully input, the registration process ends. Alice will now be presented (via web service 126) with an interface to configure her collector, and will typically never directly interact with the collector executable again, nor will she need to manually edit any local configuration files. Instead, she will configure her collector(s) entirely through interfaces provided by web service 126. Any subsequently installed collectors can be configured to report to already installed collectors (e.g., in the chaining scenario described above in conjunction with networks 112 and 110) and can also be configured to report to platform 102 directly.

Collectors have global parameters, such as the amount of bandwidth that the collector can use when exchanging information with platform 102 and what size of cache the collector is allowed to use. If any changes need to be made, Alice is able to view and modify the collector configuration through web service 126. Alice can also define data retention management policies using web service 126. For example, she can specify durations for which data should be stored, whether in raw, or parsed format, and can do so with respect to different types of data. For example, Alice can specify that PCI-related data be stored for one year, while syslog data be stored for one month.

A collector acts as a container, or chassis, for "blades." A blade is a data retrieval mechanism. Each blade knows how to access one particular type of data and may be either passive (e.g., acting as a syslog server and receiving forwarded events) or may be active (e.g., able to log into a router using user supplied or other credentials and pull data). One example type of blade is able to tail a local file. Another type of blade is able to tail a remote file. Yet another type of blade can access a domain server and obtain events. Other blades are configured to access various data sources using vendor APIs. Multiple blades can be instantiated in a single collector, including multiple blades of the same type. For example, if multiple files (e.g., in different directories) are to be "tailed," in some embodiments one blade will be instantiated per file. In some embodiments, if the files to be tailed are located in the same directory, a single blade is used to tail all of those files. Multiple blades can also be configured to access the same file, and a single blade can be configured to access multiple files across multiple directories, as applicable.

Blades are configured to acquire data and provide it to the collector with which they are associated. As will be described in more detail below, the collector packages the information it receives from the blades into messages, which it transmits to a receiver on platform 102.

For some customers (e.g., for highly distributed customers with 2,000 sites), the registration process illustrated in FIG. 2 may not be practical. Other techniques can also be used to register users and/or collectors with platform 102. For example, 2,000 tokens might be pre-generated by platform 102 and distributed to the customer, along with pre-configured collectors/blades, with instructions for installing the collectors in an automated fashion.

In various embodiments, context data is obtained as part of the registration process and/or is obtained as part of a parallel process. As one example, at 208, when the collector is installed, a separate script executes, prompting the user to answer certain contextual questions about the network, such as what types of devices are present on the network and what their IP addresses are. As another example, the user may be prompted to upload a list of assets to platform 102 using a spreadsheet, a text file, or a dump from a Configuration Management Database (CMDB) system as part of portion 214 of the process shown in FIG. 2. As yet another example, a scanning tool, such as nmap, may be included in an install package (if not already present on the device onto which the collector will be installed). When the collector is run for the first time at 210, the scanner is also run. Based on any of these device discovery techniques (or other appropriate techniques, such as MAC detection), implicated blades can be recommended to the user, can be automatically configured for the collector, or some combination thereof. As one example, if an Apache web server is detected, a blade that tails the /var/log/apache directory of the server can be recommended. The context data can be periodically updated to discover changes to the network, including the addition of new components. For example, on a weekly or other basis, new scans can be performed (and/or any of the other discovery techniques can be repeated) and new blades can be pushed to the appropriate collector (or removed from the collector) as applicable.

As will be described in more detail below, contextual data can also be used to augment message information sent by collectors to platform 102. For example, if a customer has devices such as antivirus, LDAP, or IDM servers, role managers, CMDBs, and/or vulnerability data in their network, data from those sources can be provided to platform 102 as context data (i.e., separately from the messages sent by collectors). In some embodiments, users are asked a series of interactive questions, such as whether they have a CMDB or a network scanner, and based on the answers, solutions are recommended, such as "since you don't have a network scanner, click here to install one." Updates to context data can be sent to platform 102 on any appropriate schedule, such as by performing nightly or weekly refreshes, or by sending updates whenever changes are made.

FIG. 3 illustrates an example collector message format. As will be described in more detail below, multiple messages are packaged together by collectors (into "message piles") and transmitted to platform 102 (e.g., via HTTPS) in a compressed, encrypted form. Various portions of an example message format will now be described. Other message formats (omitting portions of the illustrated message and/or augmenting portions of the illustrated message) can also be used in conjunction with the techniques described herein, as applicable.

In the example shown, the "payload" is the raw data provided to the collector by a blade. One example of a payload is an entry in a firewall log indicating that a computer having a particular source IP address and port attempted to access a particular destination IP address and port at a particular time. Another example of a payload is an entry in a log file indicating that a particular security badge was used to access a particular door at a particular time. Another example of a payload is a credit card transaction that includes a date, amount, and description. Yet another example of a payload is a log from a software application indicating that a particular event took place at a particular time.

The payload for a syslog blade would be one line. For sources where a line terminator does not necessarily map to a semantic end of line (e.g., in the case of Java logs), the message payload may be multiple lines. Different techniques can be used to determine what should constitute the boundaries of a given payload. In the previous two examples (syslog and Java logs), the boundaries conform to a specification. For other formats, regular expressions can be used to determine patterns and suggest to the user (subject to confirmation/override) how to chunk the data into appropriately sized payloads.

The "messageId" is a primary key (assigned when the message is created) and the "bladeId" is the primary identifier of the particular blade that obtained the data. As mentioned above, a given blade reports its information to a given collector (which has its own collector identifier). Thus implicitly a "collectorId" can be associated with a given message without needing to be explicitly included in the message itself.

As illustrated in FIG. 3, "source" is a struct of "source.name," "source.host," and "source.category"—metadata about the source of data that the blade is accessing. In an example where a blade is tailing a particular file, the "name" would be set to the name of the file being tailed. The "host" would be the IP address or hostname of the host from which the data is obtained, and the "category" corresponds to a user-defined category (e.g., "production server" or "testing").

Examples of "encoding" include UTF-8 and ASCII. In some embodiments, the "messageTime" is the time the message was created by the collector. In other embodiments, the "messageTime" is the time at which the data was collected, as that time is reported by the source of the data. For example, if the data is obtained from a device with a clock that is skewed by five minutes, in some embodiments the "messageTime" would be that skewed time instead of the collector's time. In various embodiments, both the time the message was created, and the reported time from the source are stored within the message. As will be described in more detail below, platform 102 can be used to enrich the contents of a message, including by inserting additional timestamp information. The "payloadSize" is the number of bytes to be expected in the aforementioned "payload."

FIG. 4 illustrates an embodiment of a collector configuration interface as rendered in a browser. In the example shown, an administrator at Cool Co. ("Charlie") has registered with platform 102, such as by using the process illustrated in FIG. 2. Charlie has entered the name of his collector in box 402 ("US West DC1 Servers") and provided applicable tags in box 404. In particular, the collector has been tagged with "West" (indicating that the collector is in the West Coast data center), "DB" (indicating that the collector is collecting information from database servers), and "PII," indicating that what is stored in those database includes personally identifiable information. In region 406, Charlie has specified various optional information, such as a description of the data sources (408) and that the data stored on the servers is subject to PCI DSS (410). Such tags can be used to partition data and significantly improve the amount of time it takes to process queries against that data.

FIG. 5 illustrates an embodiment of a source configuration interface as rendered in a browser. In the example shown, Charlie is configuring a particular blade. As with the interface shown in FIG. 4, the interface is provided by platform 102—not by a device sitting in network 114 or data centers 116-120. In the example shown, Charlie is configuring a syslog blade. Default settings for the blade (e.g., that UDP and port 514 will be used) are automatically populated, but can be changed by selecting radio button 502 or drop-down 504. Other applicable information, such as name and tag information are specified in boxes 506 and 508.

In region 510, Charlie can indicate the type of source associated with the syslog, such as by specifying that it is a firewall or that it is a router. If he selects a source type, shared settings (i.e., shared by all firewall sources) can be populated into the blade configuration, such as tag information. Other types of sources (not shown) include Confluence logs and other application logs. Tag information and/or other metadata (whether specified in a collector configuration interface or a blade configuration interface) is, in various embodiments, added to or otherwise associated with messages by platform 102, rather than that information being added by a given collector or blade.

In region 512, Charlie can indicate the vendor of the source. In various embodiments, information such as source vendor and version may be omitted by Charlie during initial configuration, but be subsequently automatically populated (or populated subject to Charlie's approval) once messages are received from that blade (e.g., based on metadata or other indicators of vendor/version). In various embodiments, Charlie is provided with the ability to override system assumptions, such as hostname information. For example, if a server from which data (e.g., log data or other machine data) is being collected is a virtual computer provided by Amazon Elastic Compute Cloud (EC2), the default hostname assumed for that server may be unwieldy. Charlie is able to specify a more appropriate hostname as applicable, using an interface such as is shown in FIG. 5.

FIG. 6 illustrates an embodiment of a source configuration interface as rendered in a browser. In the example shown, Charlie is configuring a "tail" blade. As with the interfaces shown in FIGS. 4 and 5, the interface shown in FIG. 6 is provided by platform 102. Instructions for how to configure the blade are provided to Charlie, such as in region 602. In the example shown, Charlie has manually entered a path (/var/log/*.log) to logs that reside on his administrative workstation, a Debian Linux system. In other contexts, Charlie could also have chosen to specify a remote file (or directory) location manually, and could also use the File Chooser button (604) to specify what log file(s) he would like to tail.

The interface shown in FIG. 6 can be used in conjunction with a variety of devices. As one example, some routers support logging via syslog. The router's logs can be sent to platform 102 by having an administrator make sure the logging functionality is enabled in the router, and configuring a blade to receive that log information as a syslog server. In various embodiments, configuring the router is an automated task performed by the collector application. For example, Charlie could be prompted for credential information associated with the router (e.g., the router administration login and password) and the collector application could use that information to configure the correct syslog port and other information on the router. Once configured, the router will provide log information to the blade, which provides the data to a collector which in turn transmits it to platform 102.

Other types of blades can be configured using interfaces similar to those shown in FIGS. 5 and 6, with appropriate modifications. One example is an "active" blade that logs into a particular vendor's router or otherwise communicates with the router (e.g., via an API). The configuration interface for the blade could include a region into which an administrator would enter a login or password (or other credential such as a certificate or token). Other options, such as how frequently to retrieve information from the router would also be specified in the configuration interface. As another example, in the case of a "remote tail" blade, information such as an ssh key, or NFS mount information could be provided in the blade configuration interface. As yet another example, a blade could be configured to periodically access an FTP drop site for data using supplied credentials. In various embodiments, the collector to which the blade provides data is responsible for breaking the file retrieved from the FTP site (or other multi-line data source) into discrete messages.

Figure 7:
FIG. 7 illustrates an embodiment of a collector management interface as rendered in a browser.

FIG. 7 illustrates an embodiment of a collector management interface as rendered in a browser. In the example shown, Charlie has configured two additional collectors with platform 102—one at data center 118 (702) and one at data center 120 (704). The collector that Charlie configured using the interface shown in FIG. 4 appears in region 706. Suppose Charlie wishes to modify the configuration of collector 702. To do so, he clicks on link 708 and will be presented with an interface similar to the one shown in FIG. 4. If Charlie clicks on a tag, such as "West," only those collectors having that tag (collectors 706 and 702) will be displayed in interface 700. If Charlie clicks on "Running" link 710, a search for the collector's log files will be launched. Charlie can start and stop a given collector by selecting one of the icons depicted in On/Off column 712. He can delete a collector by selecting one of the icons depicted in column 714. Charlie can create a new collector by either selecting button 718, or by cloning one of the existing collectors by selecting one of the icons depicted in column 716.

FIG. 8 illustrates an embodiment of a collector management interface as rendered in a browser. Charlie selected icon 708 in the interface shown in FIG. 7 and was presented with the interface shown in FIG. 8 as a result. In particular, by selecting icon 708, Charlie has exposed a list of the blades in region 324. As with the collectors, Charlie can modify, delete, and/or add new blades by interacting with the interface shown in FIG. 8 or other appropriate interfaces. Any changes made to collectors or to blades by Charlie (e.g., through the interfaces shown herein) will be transmitted by platform 102 to the implicated collector and take effect immediately.

In various embodiments, the collector is a microkernel and the blades can be plugged in and removed without modifying the microkernel itself. Using the techniques described herein, only those blades required for data collection at a given site need be present. If new blades are subsequently needed (e.g., because a customer has installed new hardware), only those needed blades need be sent by platform 102 to the collector. Similarly, if a given blade ceases to be needed by a collector (e.g., because the last instance of the blade has been removed from the collector's configuration), it can be removed.

Figure 9:
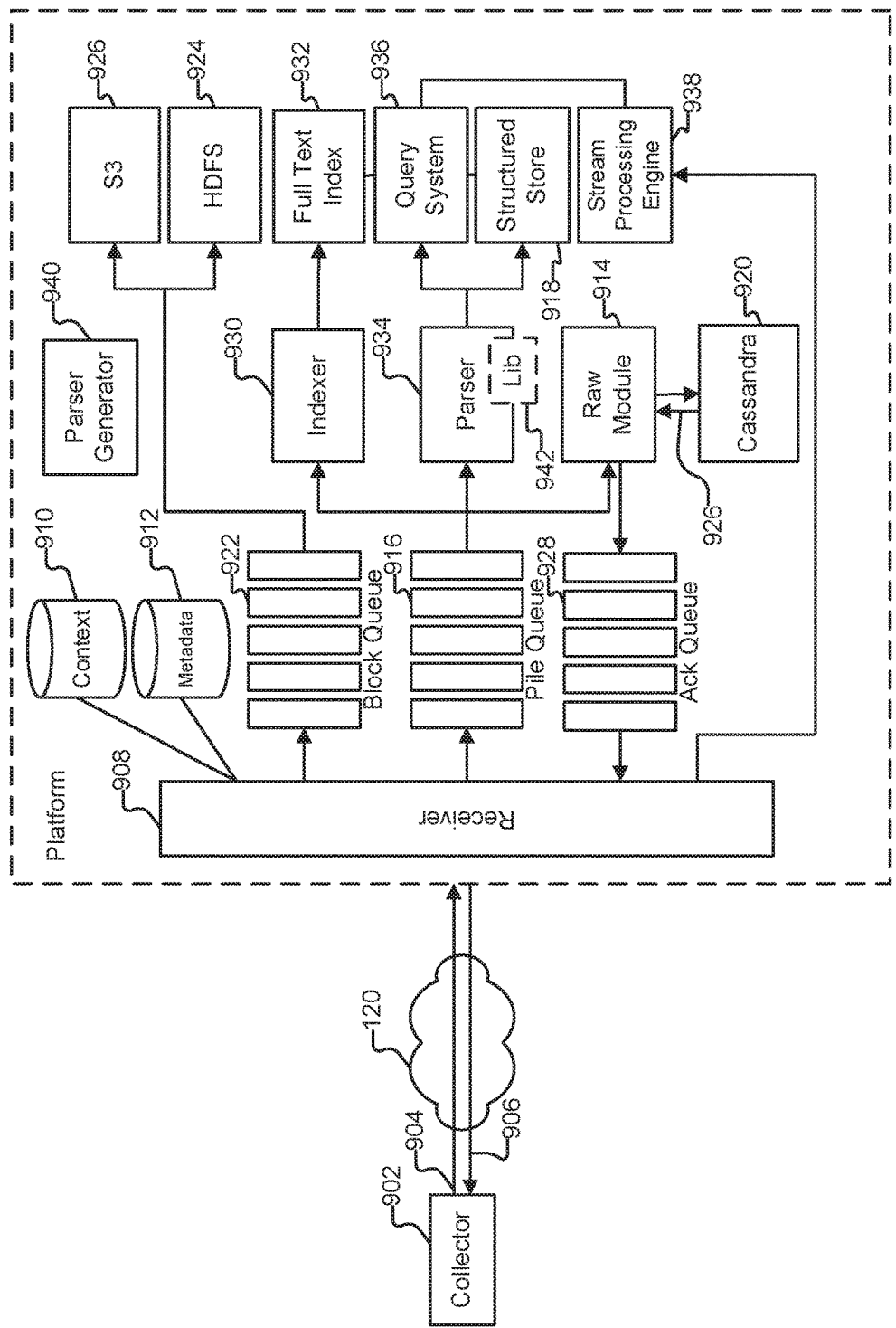
FIG. 9 illustrates an embodiment of a data collection and analysis platform.

FIG. 9 illustrates an embodiment of a data collection and analysis platform. In the example shown, collector 902 communicates with platform 102 via a receiver 908 using bidirectional communications (904/906). In particular, collector 902 sends message piles (e.g., containing 300 messages) to platform 102, optionally sends context data, and receives configuration and command messages from platform 102. In various embodiments, collector 902 also receives information for other devices from platform 102, such as by receiving alerts or remediation information to be provided by the collector to a remediation device or an administrative console.

Collector 902 also periodically sends heartbeats to platform 102. In various embodiments, collector 902 is configured to send a heartbeat to platform 102 each time more than 5 seconds (or another appropriate length of time) have elapsed since the collector last sent a communication (whether another heartbeat, or a message pile, or context data). If platform 102 notices that the heartbeats it receives from collector 902 have become sporadic or stopped entirely, platform 102 is configured to notify one or more appropriate entities. As one example, Alice may configure platform 102 to email her in the case of any detected failures of any collectors associated with Acme Company. Alice may also configure platform 102 to email an alias or group of administrators, and/or to generate alerts via other communication channels, such as sending a text message to her phone.

Database 910 is configured to store received context data in context tables. Other appropriate data structures may also be used, as applicable, depending on the nature of the context data. The context data can be mapped to portions of the data received via the message piles. For example, a given blade (having a particular blade identifier) may be associated with a particular end user workstation. Information about that user may also be received as context data obtained from Active Directory or another appropriate source. As described in more detail below, such context information is an example of data that can be used to augment messages.

Database 912 is configured to store various types of metadata. In the example shown, database 912 is distinct from raw store 920 (a distributed database). In various embodiments, database 912 (and/or database 910) are also stored by raw store 920.

In various embodiments, receiver 908 is configured to support the Avro remote procedure call and binary serialization framework. Accordingly, while collector 902 could transmit individual messages (e.g., in JSON or XML), efficiencies can be achieved by encapsulating multiple messages into a serialized compact binary format.

When a message pile is received from collector 902, receiver 908 extracts the individual messages included in the pile and enriches the messages as applicable. One benefit of enriching a message is that when the message is indexed, the result will be more useful when performing searches (e.g., by allowing the data to be partitioned in more ways). In various embodiments, messages comprise key-value pairs. Messages are enriched through the addition of other keys. The original raw data is not altered. As will be discussed in more detail below, such a message format allows platform 102 to parse and subsequently reparse message information in a versionable manner.

One example of message enrichment is the addition of various identifiers. Individual messages as created by a collector need not include a blade identifier or collector identifier (or organization identifier) at creation time. All of the messages in the pile were created based on information provided from a single blade. Accordingly, instead of including the blade identifier inside every message, the collector may stamp the message pile with the blade identifier. There is no need for the collector to stamp the pile with a collector identifier or organizational identifier because that information can be determined based on information stored in metadata database 912. Accordingly, one type of enrichment that can be performed by receiver 908 is to insert blade/collector/organizational identifiers into messages as applicable. As another example, user-supplied tag information, inferred metadata, and explicit instructions for augmenting specific fields (e.g., simplifying hostname information) can be included in the message by receiver 908.

Another type of enrichment that can be performed by receiver 908 is the addition of timestamps to messages. Suppose, as explained above in conjunction with FIG. 3, the "messageTime" portion of a message indicates the time that a given message was created by a collector. The message payload may include timestamp information that is distinct from the messageTime. For example, a particular log entry may pertain to a device with a misconfigured system clock (e.g., set to the wrong day) or may have been batch processed by a collector such that the amount of time elapsed between when the log entry was originally generated and when it was processed by the collector is different. In such cases, platform 102 can extract the value included within the log entry and enrich the message with another field, such as "sourceTime." If the value included within the log entry is incomplete (e.g., the log entry says "March 21" but omits the year), receiver 908 can ensure that the sourceTime is stored in a canonical form. Another example of a timestamp that can be used to enrich a message is the time that the receiver received the message pile.

Yet another example of enrichment is the creation of a digest of the message (e.g., based on a combination of the message and the associated organization identifier). The digest can be used for audit purposes (e.g., for the detection of tampering) and can also be used in other ways. As one example, platform 102 is a multitenant system. It is possible that data for two different customers will wind up in the same address spaces. Probes can be introduced into the overall call stacks that make explicit the call context: this call is being made on behalf of a particular user at a particular organization. As data is being assessed or produced, the actual message digest along with the organization identifier can be used to re-perform the digest computation as a check with whatever organization identifier is received from the current call context. Checks may be performed for all method calls, but may also be used on a subset of calls, such as for efficiency purposes.

Receiver 908 provides output to various components of platform 102. As one example, it places (enriched) message piles into pile queue 916. One consumer of pile queue 916 is raw module 914, which is responsible for storing message piles to one or more raw data stores. In various embodiments, the raw data store(s), rather than structured store 918 is used as the system of records. In the example shown, the raw data store is the distributed database management system Cassandra, and is used as a near term store. Cassandra has as properties that it is very fast at both reads and writes. Messages are stored in Cassandra (920) for one week. In addition, because it is a distributed system, an acknowledgement of successful write from Cassandra (926) is a good indicator of a durable write. Upon receipt of the acknowledgement, the raw module notifies (via acknowledgement queue 928) the receiver, which in turn sends an acknowledgement back to the collector. As the message piles being stored are relatively small (e.g., 300 messages), latency between when the collector transmits a pile and when it receives an acknowledgement of durable write is minimized. The piles sent by the collector and for which the acknowledgement of durable write are ultimately received include an identifier, generated by the collector. In some embodiments the acknowledgement of durable write sent back to the collector includes the applicable identifier.

Receiver 908 also places message data, repackaged into blocks, into block queue 922. Longer term storage of large files is typically more efficient than longer term storage of smaller files. Accordingly, the blocks are significantly larger than piles, and include the contents of multiple piles inside. The blocks are sent to a Hadoop Distributed File System (HDFS) 924, where they are stored for 30 days, and to Amazon S3 (926) where they are stored indefinitely. When receiver 908 generates a block, a block identifier is created and stored in metadata database 912. Additional information such as what time range it spans, whether it has been sent to S3 yet, and other applicable information is also stored in database 912. The block identifier is also associated with each of the piles whose contents are placed into the block. One way of performing such a linking is as follows: When a pile is first received from a particular organization, a new block is generated in parallel. One of the enrichments made to the pile prior to storage in raw store 920 is the block identifier.

The metadata stored in database 912 is usable to resolve queries more quickly. For example, if a query requesting the raw data for a given customer during a given time range is requested, an intersection of all the time ranges of all possible blocks can be made, thus identifying those blocks that do not need to be opened.

Queue 916 is also consumed by indexer 930 which creates a full text index 932. In some embodiments, indexer 930 receives piles from pile queue 916, examines the data in each message, and prepares the message for full text indexing by extracting tokens and building an inverse index using Lucene.

Parser engine 934 parses messages in the pile queue and stores the results in structured store 918 in accordance with an applicable schema. In various embodiments, parser engine 934 includes a library 942 of parser rules/schemas. If the message has an associated source type (e.g., specifying that the message is from an Apache server, or that it is a credit card transaction), the corresponding rule set will be selected from the library and applied when parsing. If the source type has not been specified, efficient parsing of the message can nonetheless be performed by platform 102. As will be described in more detail below, an appropriate rule set can be automatically selected from the library and used (conceptually, turning parser engine 934 into an Apache parser or credit card transaction parser), by performing a heuristic or other evaluation of the message (or sequence of messages). In some cases, a preexisting parser rule set may not exist for a given message. As will also be described in more detail below, an appropriate rule set can be automatically generated (e.g., by parser generator 940) and ultimately stored in the parser library.

In the example shown in FIG. 9, a single parser engine 934 is depicted. In various embodiments, multiple parsing engines are present within platform 102 and rules are tagged with which parsing engine(s) they pertain to. For example, one parsing engine may be configured to support the parsing of plaintext messages, while another parsing engine may be configured to support the parsing of binary data.

As explained above, structured store 918 need not serve as a system of record. Instead, structured store 918 is used as a performance optimization so that structured analytics do not need to constantly parse and reparse raw data. Indeed, because the raw message information is preserved, at any time (e.g., if improved parsers are developed), the data in the structured store (or portions thereof) can be erased and replaced, or augmented, as desired. For example, as explained above, a first customer might provide to platform 102 a rule set/schema for handling log files from an obscure application. Suppose a second customer of platform 102 (and user of the same application) initially uses the tools supplied by the first customer to store data in the structured store. The second customer subsequently improves those tools. Both customers are able to reparse (or augment, depending on how the rule set/schema have been modified) their data based on the improvements.

Stream processing engine 938 has a direct connection from the receiver and allows users such as Alice and Charlie to obtain real time information about their systems.

Query system 936 supports (e.g., via web service 126) the ability of users such as Alice and Charlie to perform queries against their data. Cross-customer data analysis can also be performed. In some embodiments query system 936 is an SQL query engine and supports batch oriented queries. In various embodiments, query system 936 pulls together data from raw module 914, structured store 918, and stream processing engine 938, and use techniques such as full text indexing to apply those sources against the input data—either individually or in combination.

Figure 10:
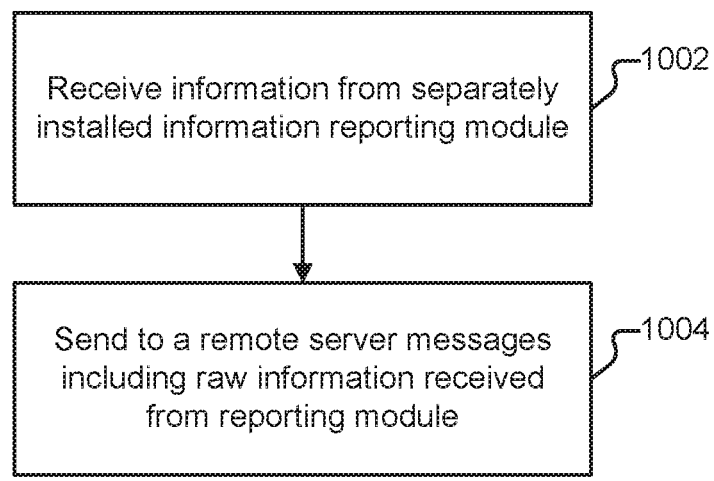
FIG. 10 illustrates an embodiment of a process for collecting and transmitting data.

FIG. 10 illustrates an embodiment of a process for collecting and transmitting data. In some embodiments the process is performed by a collector, such as collector 902. The process begins at 1002 when information from a separately installed information reporting module is received. As one example, at 1002, information from a syslog blade is received by collector 902. At 1004, messages, including the raw information received at 1002, are sent to a remote server. As one example, at 1004, collector 902 transmits a message pile to platform 102.

Figure 11:
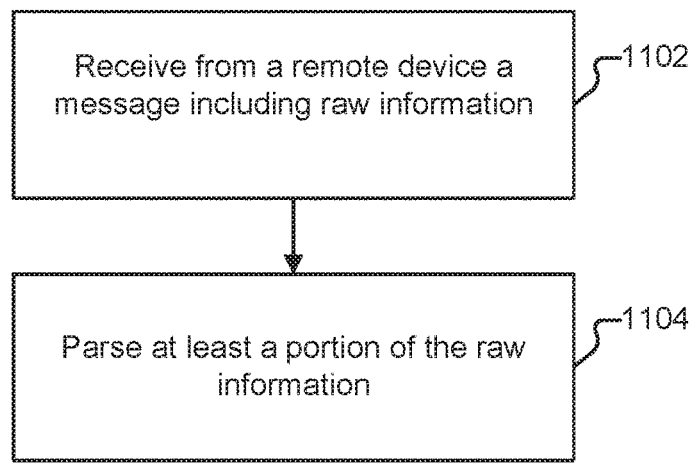
FIG. 11 illustrates an embodiment of a process for receiving and processing data.

FIG. 11 illustrates an embodiment of a process for receiving and processing data. In some embodiments the process is performed by platform 102. The process begins at 1102 when a message is received from a remote device. Included in the message is raw information. One example of raw information is unparsed information. At 1104, at least a portion of the received raw information is parsed.

Automatic Parser Selection and Usage

In various embodiments, customers of platform 102 (and/or vendors) are able to submit parser rule sets/schema to platform 102. The ability to access the submissions may be restricted in use to the submitting customer, but can also be designated for use by other customers. As one example, suppose Acme Company uses a relatively obscure application that provides as output various log files. Alice has configured a blade to supply the log files to platform 102, and the raw data is ingested into platform 102 and stored (e.g., in raw store 920). Initially, no rule sets/schema customized to the application's logs are present in library 942. Even without such tools, the received message data can nonetheless also be included in structured store 918 (if desired). For example, included in library 942 are various token definitions which can be used to recognize pieces of the syntax of the application log. Examples include IP addresses, IPv6 addresses, email addresses, usernames, date formats, and credit card numbers. In some embodiments, when such tokens are used, Alice is presented (e.g., via web service 126) with an interface asking her to confirm the tokenizations proposed by platform 102, and asking her to supply additional information about the application. As one example, Alice would be asked to confirm whether data extracted from a particular field corresponds to a date. Techniques for automatically generating a parser are described in more detail below.

Suppose Alice (either internally within Acme or in cooperation with the application's vendor) develops a full set of parser rules/schema for the application and supplies them to platform 102. Later, when a second customer of platform 102 begins using the same application, Alice's contributions will be available to parse the second customer's data, without the second customer having to expend the effort (and/or money) to develop its own set of tools. The second customer can be made aware of Alice's tools in a variety of ways. As one example, after Alice has supplied rules/schema to platform 102's library, the application can be included in the source type/source vendor options presented in interfaces such as interface 500, allowing the customer to select them. As another example, as with any other blade for which source type information has not been configured, platform 102 can attempt to automatically select an appropriate parser for that data and recommend it to the blade's administrator. A process for performing such automatic selection (whether of common rule sets, such as those for Apache logs, or of more obscure rule sets, such as may have been provided by customers) will now be described.

Figure 12:
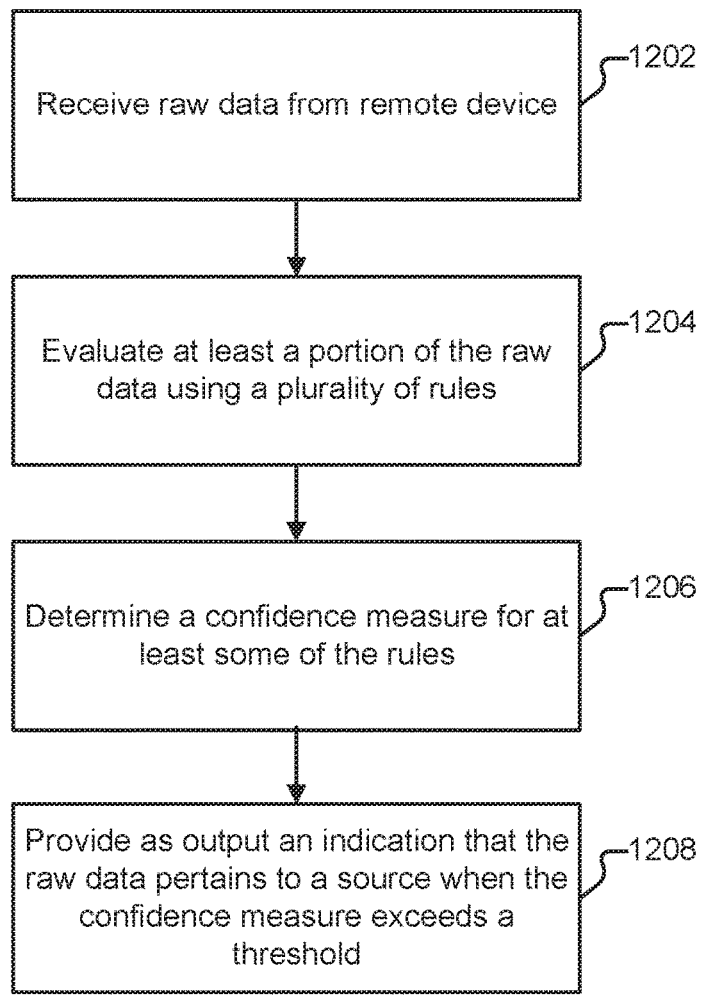
FIG. 12 illustrates an embodiment of a process for automatically selecting a parser.

FIG. 12 illustrates an embodiment of a process for automatically selecting a parser. In some embodiments the process shown in FIG. 12 is performed by platform 102. The process begins at 1202 when raw data is received from a remote source. In some embodiments portion 1202 of the process shown in FIG. 12 corresponds to portion 1102 of the process shown in FIG. 11.

Suppose Charlie has configured a blade using interface 600. Charlie has not specified a source type (or vendor) for the data. At 1204, the raw data is evaluated against a plurality of rules. As one example of the processing performed at 1204, the raw data could be evaluated (e.g., in sequence) against every rule included in library 924 by parser engine 934. As another example, in some embodiments parser engine 934 is implemented as a finite state machine and rules are evaluated in parallel. At 1206, a confidence measure is determined.

As one example of the processing performed at 1204 and 1206, the first 1,000 lines of raw data received from a blade at 1202 are evaluated against each rule in library 924. Suppose the confidence measure for the raw data with respect to an Apache access log parser is 0.999, with respect to a particular vendor's router parser is 0.321, and with respect to a credit card transaction parser is 0.005. A determination is made that the confidence measure with respect to the Apache access log parser exceeds a threshold, indicating that the received raw data is Apache log data (and in particular, access log data), with a very high confidence. As another example, as a result of processing by parser engine 934, a determination of "match" or "not match" could be made. A determination of a "match" corresponds to a high confidence value. At 1208, an indication that the raw data is Apache access log data is output.

The output of the process shown in FIG. 12 can be used in a variety of ways. As one example, the blade that provided the raw data can have its configuration updated to include an appropriate source type (and/or vendor type and version number as applicable). The configuration can be performed automatically and can also be subject to administrator approval. Data received from the blade in the future will be labeled in accordance with the source type and the determined source type can also be retroactively associated with data previously received from the blade, as applicable. For example, metadata database 912 can be updated to include the blade's source information and data already stored in either raw storage or in the structured store can be updated to reflect the newly determined source information. In the case of syslog data (which aggregates log data from multiple applications), the source type could remain set to syslog, however, individual messages of the respective contributors to the log (e.g., ssh) can be labeled.

Suppose a determination has been made, through the process shown in FIG. 12, that a given blade is supplying raw data that corresponds to a source type of an Apache access log. Also suppose that when raw data received from the blade is parsed using Apache access log parser rules, 2% of the raw data is unparseable. This may be an indication that the parser rules are out of date and need to be updated (e.g., because a new version of Apache is creating slightly different log data). In some embodiments, an administrator of platform 102 (or other appropriate entity) is alerted to the discrepancies. The process shown in FIG. 12 can be employed to detect a blade that has the wrong source type set. For example, if Alice has inadvertently designated the source type of a blade as being Apache access log data, when it is in fact data pertaining to a wireless router, platform 102 can determine that the received raw data is largely unparsable (using the Apache parser rules), execute the process shown in FIG. 12 to determine whether a more appropriate source type should have been set, and recommend to Alice that she change the source type (or automatically change it for her).

Another example of how the output generated at 1208 can be used is as follows. When parsing engine 934 parses data from the blade in the future, whether as part of an initial parse as the data is included in structured store 918, as part of a reparsing operation, or in conjunction with other types of parsing, such as may be performed by stream processing engine 938, a particular parser can be automatically selected. The specific parser need not be specified, as parser engine 934 can be configured to always evaluate all messages using all rules. However, by narrowing down the set of rules to be used when parsing, the amount of computing resources required to process the data can be reduced.

The output of the process shown in FIG. 12 can be used to automatically select a schema for which portions of the raw data should be extracted (and how they should be labeled). For example, while a particular raw message may include a total of ten columns' worth of data, the selected schema may state that the first column ("time") and third column ("temperature") should be extracted separately from the other columns, that column two should be discarded, and that columns four through ten should be merged into a single column in the structured store and assigned a collective label.

In some cases, messages may match multiple types of rules with a high confidence. As one example, suppose in an analysis of 10,000 initial lines from a blade, 90% are determined to be Apache access log data, and the remaining 10% are determined to be NTP data. This situation might arise if the device from which the blade is extracting data is an Apache web server that is configured to provide its logs to syslog (as is NTP). In this scenario, the administrator of the blade could be notified of the different types of data appearing in the syslog and be given the opportunity to have those two types of data individually tagged (e.g., with an "Apache" tag and an "ntp" tag). Further, the notice alone would alert the administrator that perhaps the logging on the device itself is misconfigured.

In some cases, none of the confidence measures determined at 1206 will exceed the threshold needed to classify the received message data (e.g., as being Apache access log data). One reason this could happen is that, as explained above, the data may be associated with a new application for which no parser rules/schema exist in library 942. As explained above, approaches such as extracting tokens from the raw data, and applying all parser rules to the data can be used to extract structure from the raw data and store it in structured store 918. In some embodiments, the data is not stored in the structured store (e.g., because storing the data in the raw store is sufficient for the data owner's purposes). Further, in some embodiments, if no appropriate parser is determined for the raw data, the data is assigned a source type of "undefined" (or other appropriate label). Periodically, such data can be reevaluated against the rules in library 942 so that, in the event new or updated parser rules are added that are a good fit for the data, the owner of the data can be alerted and offered the opportunity to begin parsing data using the applicable rules (and/or to reparse the previously received raw data for inclusion in structured store 918). In various embodiments, platform 102 is configured to generate a parser applicable to the raw data.

Automatic Parser Generation

FIG. 13A illustrates a subset of entries in a log file. Suppose the log data shown in FIG. 13A (along with several thousand additional lines) is received (e.g., at 1202 in the process shown in FIG. 12) and, after portions 1204 and 1206 of the process shown in FIG. 12 have been performed, none of the rules in library 942 are determined to be a match (e.g., because all of the confidence measures are low). In some embodiments, one or more parser rules are generated using the raw data according to the following techniques.

Figure 14:
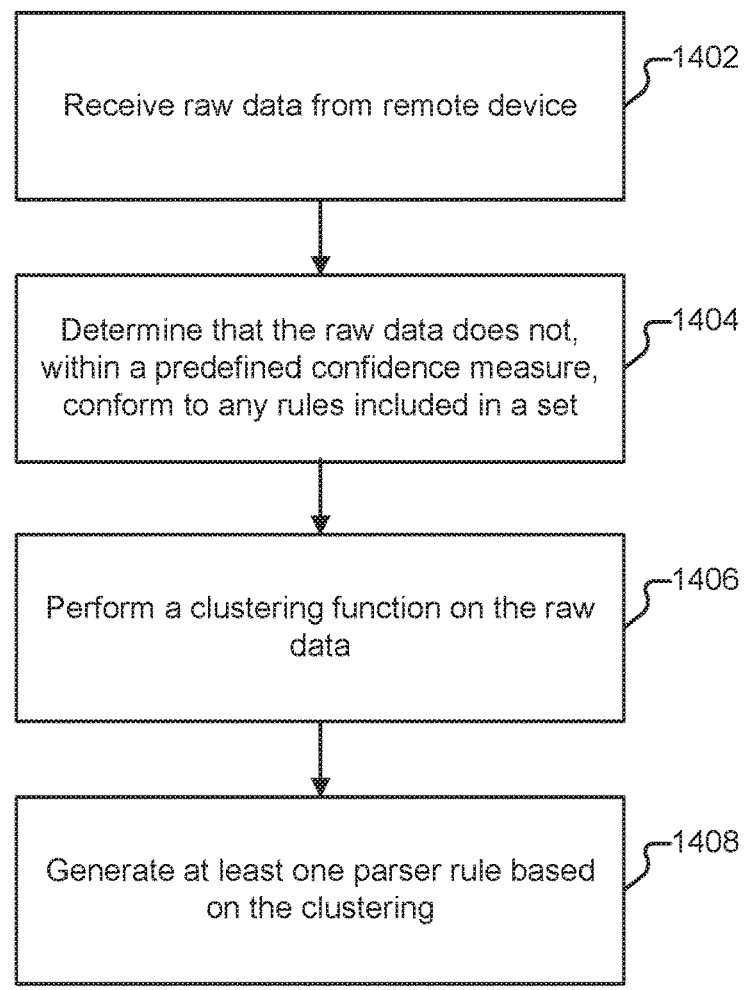
FIG. 14 illustrates an embodiment of a process for automatically generating a parser.

FIG. 14 illustrates an embodiment of a process for automatically generating a parser. In some embodiments, the process shown in FIG. 14 is performed by platform 102. The process begins at 1402 when raw data is received from a remote source. In some embodiments portion 1402 of the process shown in FIG. 14 corresponds to portion 1202 of the process shown in FIG. 12. At 1404, a determination is made that the raw data does not conform to any rules included in a set, such as the rules included in library 942. As one example, at 1404, the confidence measures determined at 1206 are evaluated and a conclusion is reached that none of the measures exceeds a threshold.

At 1406, the raw data is clustered using an appropriate clustering technique. The data shown in FIG. 13A could be clustered into one (or a few) clusters, depending on the clustering technique employed. When thousands of lines are considered, several clusters might emerge. For each cluster, a determination is made of which values in each line are variable across the cluster, and which remain constant, as well as boundary information. As one example, in the data shown in FIG. 13A, "Port" (1302) is present in all five lines, as is "STP State" (1304), while the data in column 1306 changes (e.g., is the value 2, 4, 6, or 16). Other values (e.g., "October 27") which appear to be constant based on the lines shown in FIG. 13A would (after evaluating a sufficient number of lines) be determined to change.

Regular expressions that match the analyzed clusters can then be automatically generated and structure inferred, such as the number and size of columns. Using the lines shown in FIG. 13A, a sample regular expression that would match all of the lines is shown in FIG. 13B. The regular expression shown in FIG. 13B is an example of a parser rule (1406). Other rules applicable to other lines of the log (not shown) could also be generated to form a set of parser rules for the blade from which the raw data is received (e.g., at 1402).

As explained above, library 942 includes various token definitions for entries such as IP addresses and email addresses. In some embodiments, in addition to generating a set of parser rules for the data received at 1402, labels for at least some of the columns are automatically selected (e.g., using the token definitions). Using the example shown in FIG. 13A, tokenization could be used to identify the first portion of each line as being a date, and a time, respectively, or an absolute time, collectively.

In various embodiments, the parser rule(s) generated at 1408 (and any associated column labels) are presented to a human for review. The human may be an agent/employee of platform 102, but may also be an administrator of the blade from which the raw data used to form the rules/labels was received (i.e., at 1402). Errors may be present in the automatically generated rule(s), and the column labels may be incorrect or incomplete. As one example, the regular expression shown in FIG. 13B indicates that "Host123" is static information. An administrator of the blade might recognize that "Host123" is a "hostname" (thus supplying a label that was not able to be determined by platform 102) and also indicate that instead of being represented in the rule as "Host123" it should instead be represented as "\a+," so that the rule can be generalized for use with other hosts (including hosts of other customers).

The rules/labels can be confirmed, or modified as applicable, and then saved for future use, such as by being included in library 942. The administrator of the blade can also be asked to provide additional contextual information. As one example, a dialog can be presented to the administrator that says, "We've detected that you're sending us data from a new kind of log. Please help us improve our tools by identifying the source of the data." Information provided by the administrator can be used to associate a source type (and/or source vendor and version) with the generated parser rule(s)/labels.

As explained above, customers can leverage tools provided to library 942 by other customers. Thus, if a second customer has a blade that transmits message data that is sufficiently similar to the data shown in FIG. 13A, the generated parser(s)/labels can be automatically selected for use by platform 102 and/or can be recommended to the second customer. A source type for the second customer's blade can similarly be recommended based on information provided by the first customer. The second customer can also be presented with the selected rule(s) and labels and given the opportunity to modify them as necessary. For example, the second customer may notice that the rule does not cover all of the applicable states (e.g., listening, disabled, learning).

Log Data Analysis—"Summarization"

Figure 15:
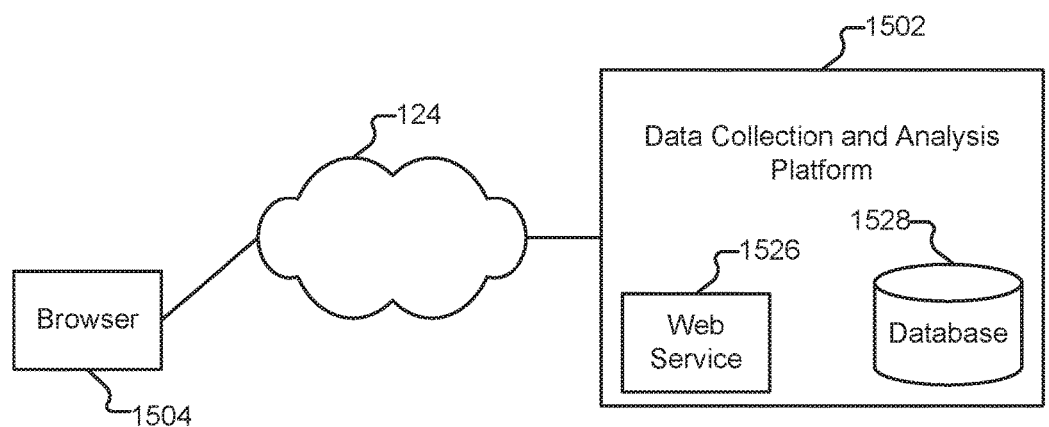
FIG. 15 illustrates an environment in which log data is collected and analyzed.

FIG. 15 illustrates an environment in which log data is collected and analyzed. In the example shown, platform 1502 is an embodiment of platform 102. As shown in FIG. 15, a user of browser 1504, such as Alice, can access platform 1502 via a web service 1526. Web service 1526 is an embodiment of web service 126. As will be described in more detail below, various data manipulation and visualization tools are made available via platform 1502.

FIG. 16A illustrates a subset of entries in a log file. The log file has thousands of entries and its contents are periodically sent (e.g., by a collector) to platform 1502. As will be discussed in more detail below, lines 1602-1608 were inserted into the log by a C program, a portion of which is shown in FIG. 16B. In particular, lines 1602-1608 were inserted by the print statement on line 1652.

Suppose the data shown in FIG. 16A pertains to a disk controller located in Acme Company's network. The disk controller has an associated collector called "disk-controllerA-collector." Alice believes the disk controller may be malfunctioning. She would like to view the logs associated with the controller as part of her investigation, but is daunted by the prospect of reviewing thousands of lines of logs (or more).

Alice visits platform 1502 using browser 1504, logs in to her account (as an Acme Company administrator), and is presented with interface 1700 shown in FIG. 17. She can perform queries on Acme's data by submitting them in box 1702. As one example, Alice could enter the name of the collector "disk-controllerA-collector" into box 1702. She can specify a time range for the log entries she would like to view by selecting an appropriate range (e.g., "last fifteen minutes," "yesterday," "this week," "October 10 midnight through October 12 noon") via dropdown 1704.

Figure 18:
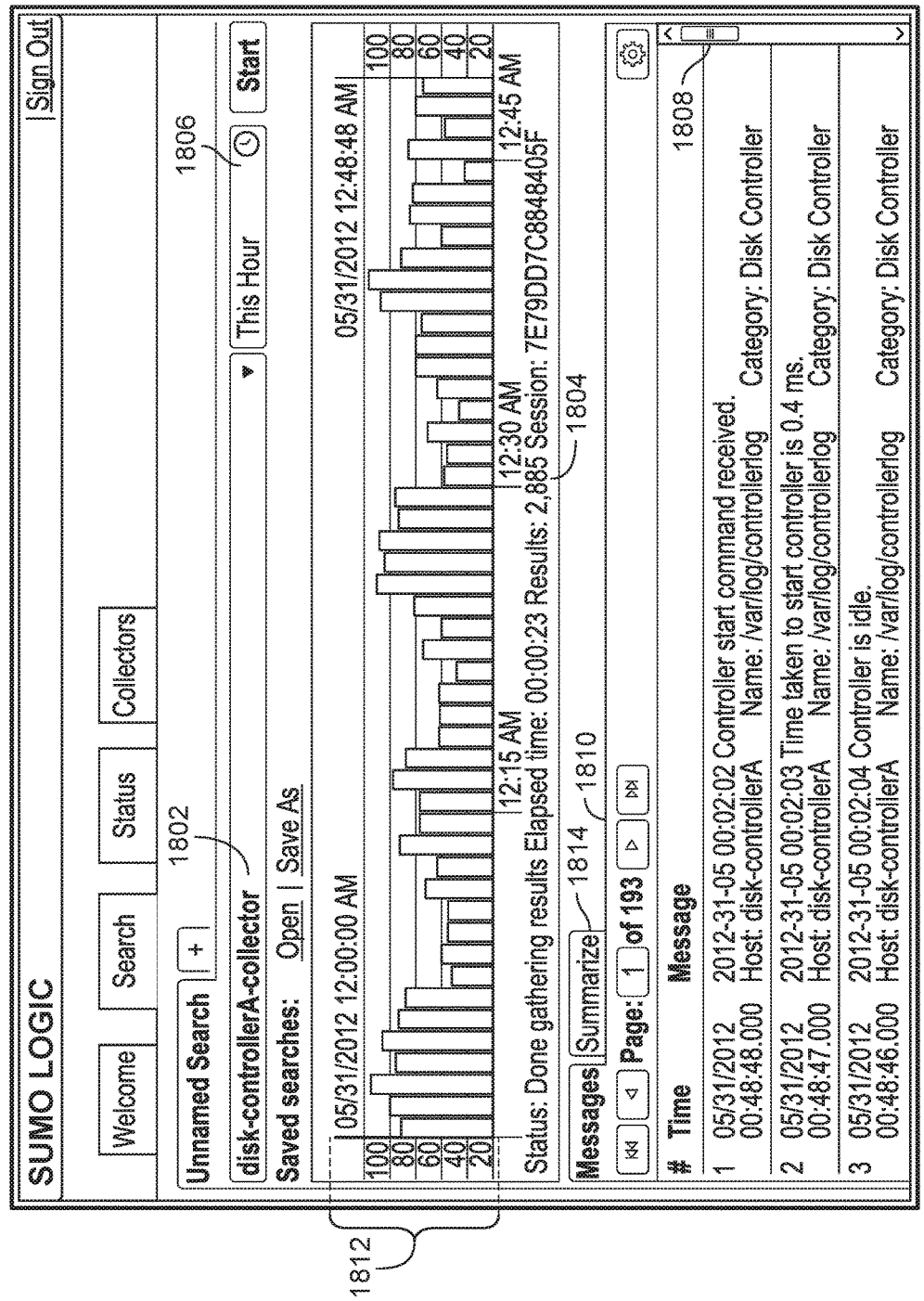
FIG. 18 illustrates an embodiment of an interface as rendered in a browser.

FIG. 18 illustrates interface 1700 after Alice has entered a query term into box 1702 (1802) and selected start button 1706. As indicated in region 1804, a total of 2,885 individual messages (e.g., log lines) pertaining to the disk controller collector were generated in the time frame selected by Alice (1806). A graph depicting when, over the time frame, the messages were generated is shown in region 1812.

Alice could manually review each of the messages by interacting with scroll bar 1808 and controls 1810. However, doing so could potentially take Alice hours of time. Further, Alice may inadvertently miss important or otherwise interesting messages due to the sheer volume of messages she is reviewing, the bulk of which may be uninteresting.

Figure 19:
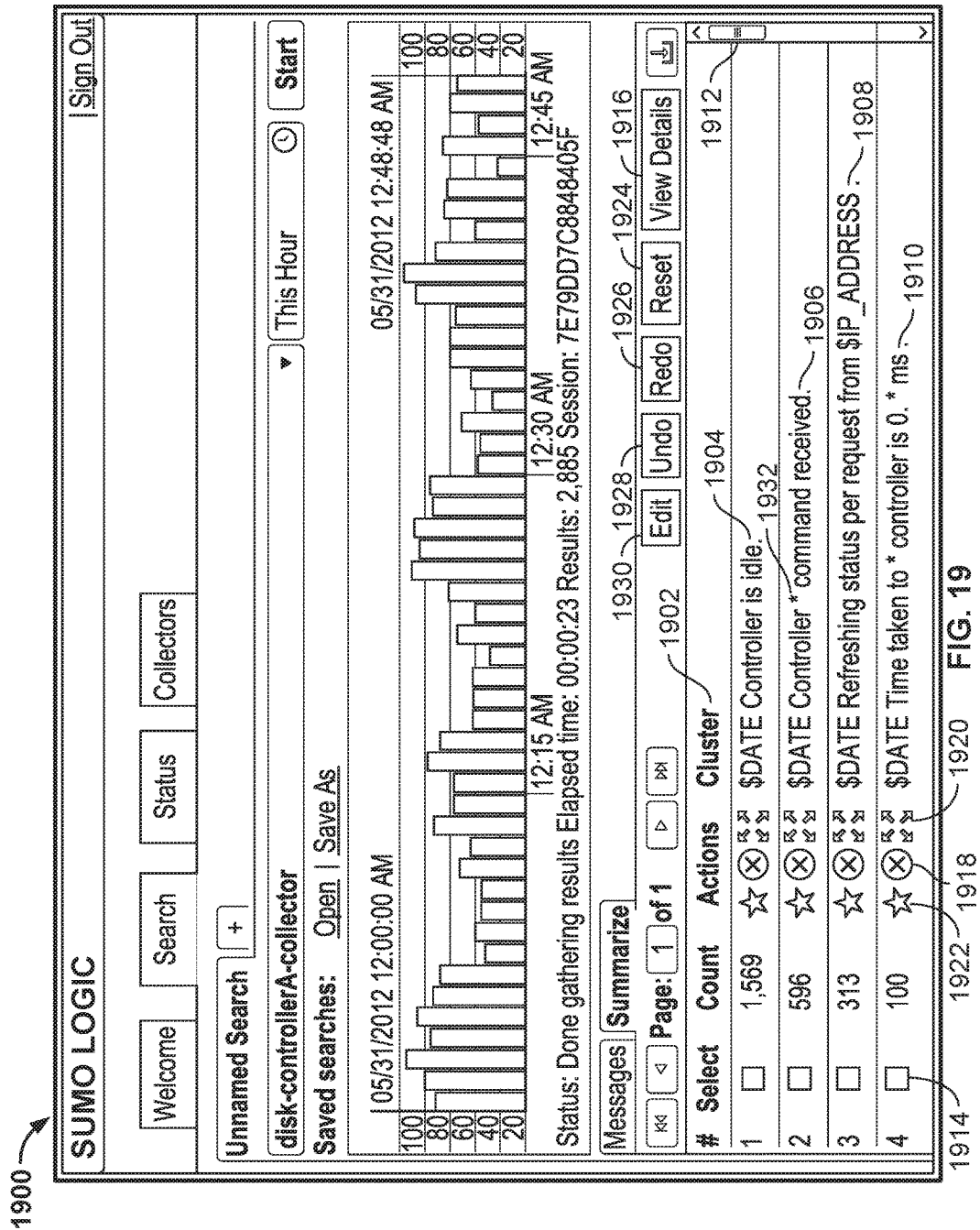
FIG. 19 illustrates an embodiment of an interface as rendered in a browser.

If Alice clicks on "Summarize" tab 1814, she will be presented with interface 1900, shown in FIG. 19. The Summarize view groups messages by content similarity into clusters. In particular, messages with similar structures and common repeated text strings are grouped. The clusters in the summary view are dynamically generated. For example, if Alice selects a longer or shorter time range, includes multiple collectors in her query term, etc., the clustering results will change.

Cluster column 1902 displays a "signature" for each cluster. The content of each message in a given cluster conforms to the signature. Within a given cluster signature, fields that vary (and, in the example shown, are not tokenized) are displayed with wild card placeholders (e.g., "*") while tokenized fields such as timestamps and IP addresses are replaced with appropriate placeholder variables (e.g., "$DATE" and "$IP_ADDRESS", respectively). As will be described in more detail below, Alice can modify the signatures so that a given static or tokenized field becomes more generalized (e.g., by changing "Controller" to "*", or "0.*" to "% double") and/or so that generalized fields become more specific (e.g., by changing "$IP_ADDRESS" to a specific IP address).

As indicated in line 1904, a total of 1,569 messages in the log for the specified time frame are "controller is idle" messages. As indicated in line 1906, a total of 596 messages collectively indicate that the controller has received some type of command. As indicated in line 1908, a total of 313 messages collectively indicate a status request was received from a variety of hosts. Finally, as indicated in line 1910, a total of 100 messages collectively indicate a time taken by the controller to perform an action, in milliseconds. Additional messages (e.g., in clusters of size smaller than 100) can be viewed by operating scroll bar 1912. Messages that are not readily grouped into clusters are separated into a distinct cluster called "Others." The "Others" cluster might contain simple miscellaneous messages that are not important, or it might include anomalous messages that are meaningful. To investigate, Alice could locate the "Others" cluster (e.g., by scrolling down) and "zoom in."

Figure 20:
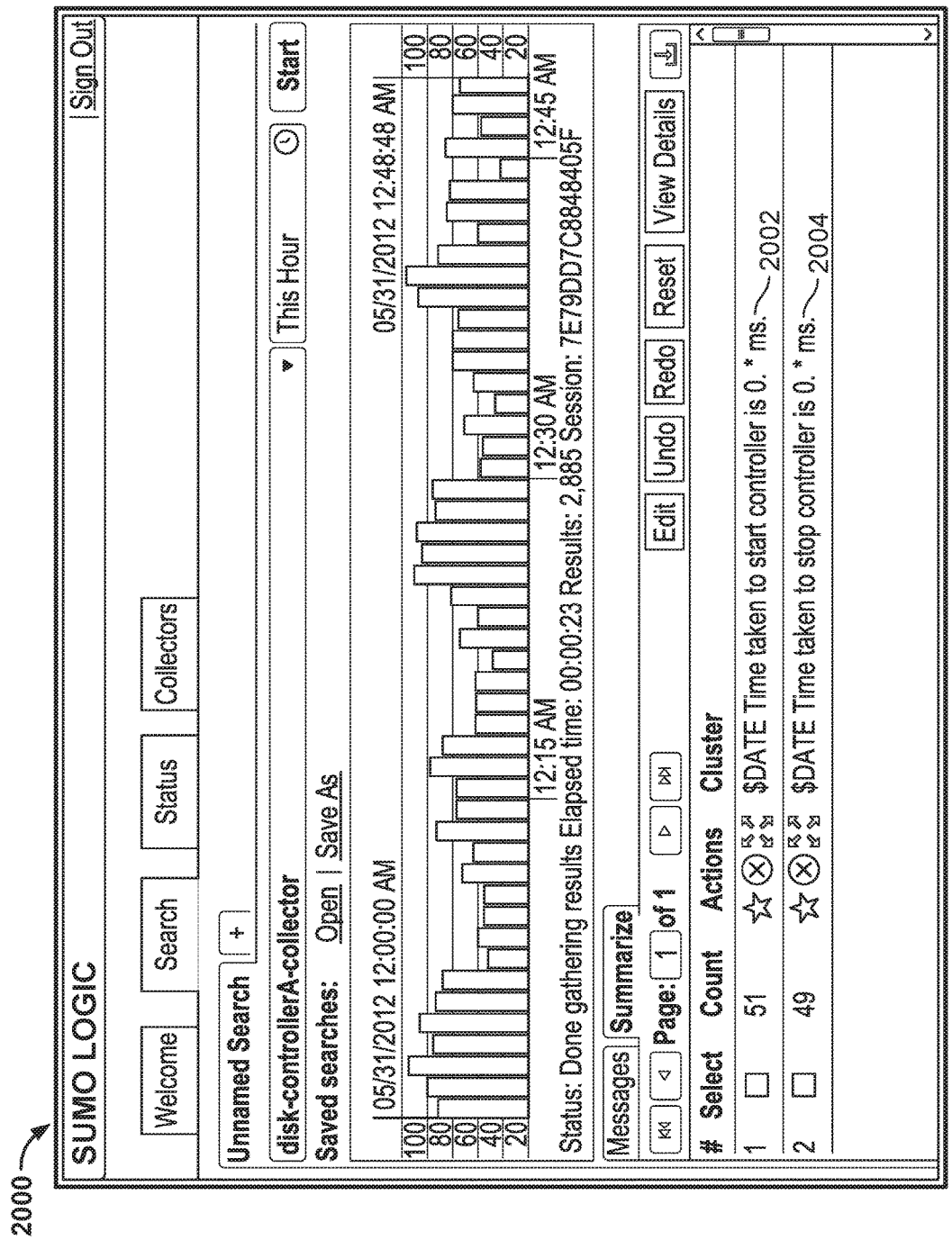
FIG. 20 illustrates an embodiment of an interface as rendered in a browser.

Alice can "zoom in" on a given cluster and show its sub-clusters (if applicable) by clicking the appropriate box in the "Select" column (e.g., select button 1914) and clicking "View Details" button 1916. Interface 2000, shown in FIG. 20, depicts interface 1900 after Alice has elected to zoom in on line 1910. Lines 2002 and 2004 illustrate that the "Time taken to * controller" messages appear in two forms in the log—time taken to "start" (2002) and time taken to "stop" (2004).

Alice can also take other actions with respect to the clusters shown in interfaces 1900 and 2000. For example, she can hide a given cluster by clicking icon 1918, causing it to disappear from the results list. In some embodiments, clusters (and/or signatures) are hierarchical in nature. As one example, the signature shown in line 1910 can be considered a parent of the signatures shown in lines 2002 and 2004, which are leaves. Alice can break a single cluster into multiple clusters (i.e., cause a parent cluster to be broken into children) by clicking icon 1920, if applicable. As one example, Alice could break the cluster indicated in line 1910 into the two sub-clusters indicated on lines 2002 and 2004 by clicking icon 1920. If a cluster cannot be broken further (e.g., leaf cluster 2002), icon 1920 will be greyed out. Alice can mark a cluster (i.e., signature) as important by clicking on icon 1922. If Alice re-runs a query (e.g., with a different time range or additional parameters), any clusters marked as "important" will remain as separate clusters, irrespective of whether a clustering operation run against the results of the new query would have yielded that cluster. Alice can undo (1928) and redo (1926) actions, and can also reset any preferences (e.g., showing previously hidden clusters) by clicking button 1924.

In some cases, Alice may want to edit the signature of a cluster. For example, if the signature shown in line 1910 was not present in the interface shown in FIG. 19 and instead the signatures of lines 2002 and 2004 were, Alice could edit one of the signatures (or create a new parent signature) that generalized the "stop" and "start" portions of the signatures into a "*" or other appropriate generalization. Various additional examples of signature editing are as follows:

Incomplete Field:

As previously explained, lines 1602-1608 were generated by a C program, a portion of which is depicted in FIG. 16B. Line 1652 of the program inserts into the log the time, in milliseconds, taken to start or stop the controller. Each of the time values present in lines 1602-1608 is less than a millisecond, and thus is prefaced with "0.". The signature depicted in line 1910 treats the "0." as static text. Suppose that upon reviewing the signature, Alice determines that "0.*" should be generalized to "*". She may have written the program shown in FIG. 16B and thus have domain knowledge about what the format should generalize to. It may also be the case that the correction needed would be evident to anyone viewing the data. For example, an individual might readily identify that a field corresponds to a sequence number (e.g., "38483749123") and that the entire value should be represented as a variable, rather than being partially represented by static information (e.g., "3848374*"). Alice can modify the signature accordingly by selecting line 1910 and clicking the edit button 1930, which will present her with an editable copy of the signature. In various embodiments, additional wildcards are available, such as ones allowing Alice to specify data types (e.g., integer vs. double). Alice's edits can be saved—whether for the rest of her query session, or more permanently (e.g., in database 1528 as JSON).

In some embodiments, Alice's edits are made available to other users of platform 1502. Examples include making the cluster signature available to other employees of Acme who might manipulate the same data (i.e., data from that particular collector) and employees of Acme who might manipulate similar data (e.g., data from other disk controllers). In some embodiments, the contents of database 1528 are made globally available (e.g., available to all users of platform 1502, irrespective of whether or not they work for Acme). In various embodiments, prior to a new signature being included in database 1528, the user whose data was used to generate the signature is prompted for permission. As one example, the data Alice is examining in interface 1900 may have a signature generated for it that is not currently stored in database 1528. Prior to the signature being included in database 1528, Alice may be asked to confirm that the signature does not contain any confidential information (e.g., internal IP addresses or employee identifiers) and/or may be asked to edit the signature to remove any confidential information present, as applicable. Alice can also be asked to provide a description of what the signature represents (e.g., as metadata) to be stored in database 1528. As one example, a given signature generated by platform 1502 (and/or refined by Alice) for an Apache log might represent a URL request. When Alice is prompted to add the signature to database 1528, she is asked to explain the nature of the line. In some embodiments, the signature label, rather than the signature itself, is displayed in interface 1900 (e.g., as a user customizable option).

Missed Field:

In some cases, such as where the time window specified by Alice via dropdown 1704 is small, text that is variable will erroneously be treated as if it is static. As one example, if Alice selected a shorter time period than what is shown, the messages corresponding to line 1908 might be generated with respect to a single IP address (e.g., 10.0.0.1), rather than multiple IP addresses. The signature generated might thus include that single IP address as a static field. Alice can modify the signature to transform the specific IP address into the variable, "$IP_ADDRESS" as needed.

Misunderstood field: Similar to the incomplete field example above, for some data in a message, such as a URL, portions of the data may erroneously be treated as fixed rather than variable. As one example, log entries that include permutations of "www.example.com/page123.html" might be erroneously generalized to "www.*.com/page.html" when "$URL" or "www.example.com/*" or some other generalization might be more appropriate. Alice can modify the fields in the signature as needed/desired. In various embodiments, Alice is able to assign labels to the fields (e.g., denoting an internal IP address vs. an external IP address). Fields can also be hierarchical, e.g., with "$EXTERNAL_IP" being a child of "$IP_ADDRESS".

Alice can also interact with other regions of interfaces 1900 and 2000. For example, in some embodiments, if Alice hovers her mouse over star 1932, a floating list of each of the values that is generalized by that star is shown. Alice can interact with the list, e.g., by hiding entries with certain values—designating values that should be used to split the cluster into separate clusters, etc. As one example, Alice could opt to hide messages matching the signature shown in line 1910 where the time is under 0.3 ms. As another example, Alice could opt to break the messages matching the signature shown in line 1906 into clusters corresponding to each of the specific actions subsumed by the wildcard.

Figure 21:
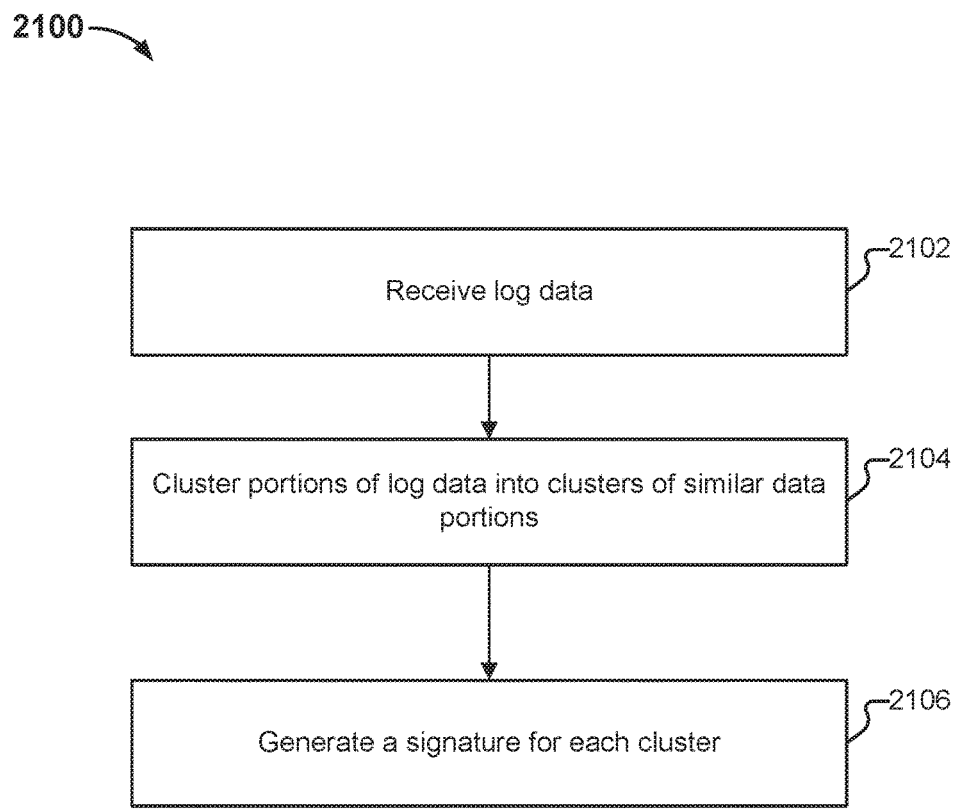
FIG. 21 illustrates an embodiment of a process for analyzing log data.

FIG. 21 illustrates an embodiment of a process for analyzing log data. In some embodiments, process 2100 is performed by platform 1502. The process begins at 2102 when log data is received. The log data can be received in a variety of ways. For example, it can be received as a real time stream (e.g., directly from a collector), it can be retrieved from a storage, and can also be received from multiple sources (e.g., multiple streams tagged with identifiers). Further, the received data can be refined through the use of one or more query terms (e.g., limiting the received data to just that data that includes a keyword, limiting the received data to a particular time frame, and/or any other applicable constraints). As one example, log data is received at 2102 when Alice clicks on "Summarize" tab 1814, indicating which data she wishes to be analyzed. In some embodiments, query results are always summarized, e.g., without Alice having to click on tab 1814.

At 2104, the received log data is clustered. A variety of approaches can be used to perform the clustering. As one example, the log data can be clustered using nearest neighbor. Another approach is to perform a hierarchical clustering using fuzzy matching. Matches with scores above a certain threshold (e.g., 95%) are deemed to belong to the same cluster. In some embodiments, the score represents a confidence that the lines were generated with the same print statement.

Finally, at 2106, a signature is generated for each cluster. One approach to generating a signature is to determine a print statement that could have generated each of the lines in the cluster. In particular, the static (constant) portions are determined and the non-static portions are generalized (e.g., using tokens and/or wild cards). Using lines 1602-1608 as an example, "Time taken to" aligns across all four lines and is treated as static (constant) information, as is "controller is." The portion in between (i.e., "start" or "stop") is generalized, e.g., to any of: the wild card "*", a text string, and a regular expression (e.g., [start,stop]), as appropriate. As shown at 1910 in FIG. 19, an example of a signature for lines 1602-1608 is "$DATE Time taken to * controller is 0.* ms".

In some embodiments, the log data operated on by process 2100 is already tokenized (e.g., as a result of at least a portion of process 1200 being performed on the data previously). A token library can also be used to automatically generalize fields in a given cluster as process 2100 is performed, such as email addresses, IP addresses, and date/time information. Rudimentary data types and other classifications such as "double," "int," and "Boolean" can also be used within the signature to offer additional granularity of generalization between the spectrum of fixed text (i.e., literal matches) and a "*" wildcard (i.e., matching everything).

In various embodiments, multiple iterations of portions 2104 and 2106 of process 2100 are performed, and/or portions 2104 and 2106 are performed in parallel. As one example, when Alice first begins her query session (e.g., when she encounters interface 1700 after logging in), the set of signatures associated with the session may be empty. As messages are received and processed, the set of signatures increases (e.g., with the first message being used to create a signature, and additional messages either matching the signature or forming the basis of new signatures, as applicable). As previously mentioned, signatures can also be stored (e.g., in database 1528) and used as a library instead of generating all signatures from scratch for each session. For example, a signature that matches the presence of a failed login attempt in a particular kind of log data may be of interest to virtually anyone reviewing that log data. Such a signature could be included in database 1528.

Additional Refinement and Personalization Examples

As explained above, users of platform 1502 can refine signatures by taking such actions as splitting overly generalized patterns into finer-grained signatures and/or editing overly specific signatures (e.g., to mark fields as wild cards). The refinements (e.g., made by one user) can be stored by platform 1502 for later use (whether by the same user or another user). Also as explained above, a user can indicate an importance of kinds of information (e.g., by marking a signature important via button 1922 or hiding it via button 1918 as shown in FIG. 19). The captured user feedback can be used to shape the ranking of query results: both by promoting/demoting signatures, and also to compute a relevance score which can be used to rank signatures according to their content. The relevance profiles can be individually tailored (e.g., per user) and can also be made available to multiple users (e.g., within a single organization or across multiple organizations) in accordance with any applicable confidentiality/permission requirements. Additional examples of refinement and personalization made available via embodiments of platform 1502 are provided below.

Promotion and Demotion

FIG. 22A illustrates a portion of an interface as rendered in a browser. Depicted in FIG. 22A are query results, presented in an embodiment of Summarize view (described, e.g., in conjunction with FIG. 19 above). As with column 1902 of FIG. 19, column 2202 displays a "signature" for each cluster. The signatures can be refined by the user interacting with edit button 2208 and/or split button 2210. The results are initially ranked based on the values appearing in column 2204, which indicates the number of lines (i.e., count) matching a given signature. As indicated in column 2206, each signature is given an initial (default) neutral relevance value of "5," which can be manipulated by interacting with thumb up (promotion) button 2212 and thumb down (demotion) button 2214. Explicit relevance scores can be given to signatures (e.g., 10 for a thumb up; 0 for a thumb down), and scores for signatures can also be computed based on various matching criteria. Further, while relevance scores can be assigned uniformly (e.g., all signatures receiving a thumb up being accorded a score of 10), such scores can also be assigned based on a variety of factors. For example, signatures can be categorized (e.g., by a signature curator, or by an end user) as pertaining to "error" (more severe/interesting) or "warning" (less severe/interesting); "critical" infrastructure (more interesting) or "non-critical" infrastructure (less interesting). Relevance scores can be weighted based on such categorization. As one example, a thumb up vote for a rule could be accorded a score of ten multiplied by its severity (e.g., with an error receiving 10×1.0 as a score and a warning receiving 10×0.7 as a score—both of which would still be higher than the default of 5).

Suppose the viewer of the results depicted in FIG. 22A (hereinafter "Tom") is responsible for ensuring that a database system is functioning properly. Tom would like to promote those signatures that pertain to the database. He clicks on the thumb up icon accompanying line 2216 and is presented with a revised review of results, shown in FIG. 22B. In various embodiments, additional information is collected from Tom. For example, given that he has indicated the signature is important/interesting, he can be asked to help populate/verify information about the signature as stored in database 1528, such as by providing a description of what the signature indicates (which may not be apparent based on the signature itself), its severity, etc. (e.g., "this indicates the database is running out of disk space" or "the system is running out of RAM").

As shown in FIG. 22B, the signature Tom promoted (2216) has now been moved to the top of the results, and has been accorded the maximum relevance score of 10 and moved to the top of the results. As Tom performs additional Summarize queries, signature 2216 will continue to appear at the top of results (unless Tom later chooses to undo its promotion by clicking the thumb again). The scores of the two other database-related signatures (2218 and 2220) have increased as well, improving their rankings. This occurred because the content of signatures 2218 and 2220 is similar to the promoted database signature (e.g., matched within a threshold value). The relevance score boost can be persisted to additional searches. For example, in some embodiments, database 1528 stores various backend tables with the following columns: organization, user, query, signature, thumb up, thumb down. The information is used to track the identity of the current user, what query he is running, the organization to which he belongs, the signature he provided feedback on, and what the feedback was (e.g., thumb up or down). Other information (e.g., implicit feedback discussed in more detail below) can also be included (or omitted) as applicable. The stored information can be used in a variety of ways. As one example, the data can be maintained for a single session (e.g., stored in RAM instead of or in addition to database 1528) and available only to that single user. As another example, the feedback of multiple users (e.g., within the same organization) can be pooled. For example, as explained above, database 1528 can configured to store a set of globally accessible signatures (e.g., 10,000 signatures). Each signature can have associated with it a set of relevance scores. One such type of score is a per-user relevance score (e.g., included in the database for a user when that user interacts with the relevance buttons for the signature). Another such type of score is an organizational relevance score (whether provided by an administrator on behalf of the organization, determined as a composite of the user scores of all users in an organization, etc.). A third such type of score is a global relevance score (e.g., provided by an administrator of platform 1502 or other signature curator, determined as a composite of all, or a portion of the relevance scores for the signature across all users of the system, etc.). In some embodiments, a global relevance score is only computed for a signature if at least three (or more) organizations have data matching the signature—indicating that the source of the data is unlikely to be proprietary.

Returning to the examples of FIGS. 22A and 22B, suppose, due to his intense focus on database management, Tom finds log messages about compute jobs to be distracting noise in the search results. One option for Tom would be to "blacklist" such distracting messages by adding Boolean negations to his original query string (e.g., "!comput*"). However, this approach may not be very practical. For example, as he adds more and more terms to his search, it becomes increasingly likely that he will unintentionally filter out messages that are actually important to him. Another option for Tom is to instead demote one of the computation-related signatures (e.g., signature 2222), resulting in it being accorded an explicit relevance value of zero.

As shown in FIG. 22C, after Tom clicks on thumb down 2224 (of the interface shown in FIG. 22B), signature 2222 drops to the bottom of the results (2226). Other actions can also be taken, such as hiding signature 2222. As with promotion of signatures, the relevance and ranking of the other similar computation-related signature has also been lowered (2228), e.g., based on a fuzzy match to the down-rated signature within a tolerance, and this behavior will be persisted across other Summarize queries for Tom.

In some embodiments, in addition to taking into account explicit user feedback (e.g., promotion and demotion), platform 1502 also tracks and leverages the implicit signals present in user behavior. As one example, when Tom performs a "View Details" drill-down into a particular signature to view the raw logs, platform 1502 considers this to be a weaker form of evidence to increase the relevance scores of related signatures.

The relevance score for a signature can be determined in a variety of ways. In some embodiments, it is calculated by a formula that outputs a value between 1 and 10 (inclusive). Starting with a default value of 5, the relevance of a signature is adjusted based on the explicit (and, as applicable, implicit) feedback provided. For example, an explicit thumb up results in a given signature being assigned a score of 10, while an explicit thumb down results in a given signature being assigned a score of 0. Where a signature contains terms that have received previous feedback (but the signature has not itself received feedback), a score falling between 0 and 10 can be assigned. For example, when Tom clicked the thumb up button appearing on line 2216, platform 1502 noted that the signature included the term, "database," and promoted the other signatures containing "database" (2218, 2220) as well, by increasing their relevance scores.

In some embodiments, only the feedback matching a particular context (e.g., same user, same query) is taken into account when adjusting the relevance score of a signature. For example, in some embodiments, feedback that Tom provides by interacting with the interfaces shown in FIGS. 22A-22C does not get applied to other queries performed by Tom, or to the same query when run by other individuals. In other embodiments, when the context of a query is sufficiently similar to a query for which relevance feedback has been provided, the user can be presented with an option to incorporate the previously supplied relevance information into the current query (or the relevance can be applied automatically/by default). For example, when Tom runs a query that is at least 80% similar to a previous query he supplied relevance information for, he can be presented with an option in the interface to review those signatures he supplied relevance indicators for previously (and confirm whether he would like to adopt those previously supplied relevance indicators again or leave the relevance for those signatures at the default). As another example, a different user (e.g., in the same organization, or in another organization) running a query that is at least 90% similar to Tom's query can be shown an indication that relevance information is present for the query and similarly asked whether the user would like to incorporate Tom's relevance indications into the user's current search. As yet another example, when a different user within Tom's organization runs an identical query to one Tom provided relevance feedback on, the other user's results can automatically be accorded Tom's relevance feedback (or, the user can be given the option to use/see Tom's relevance feedback, as applicable).

Figure 23:
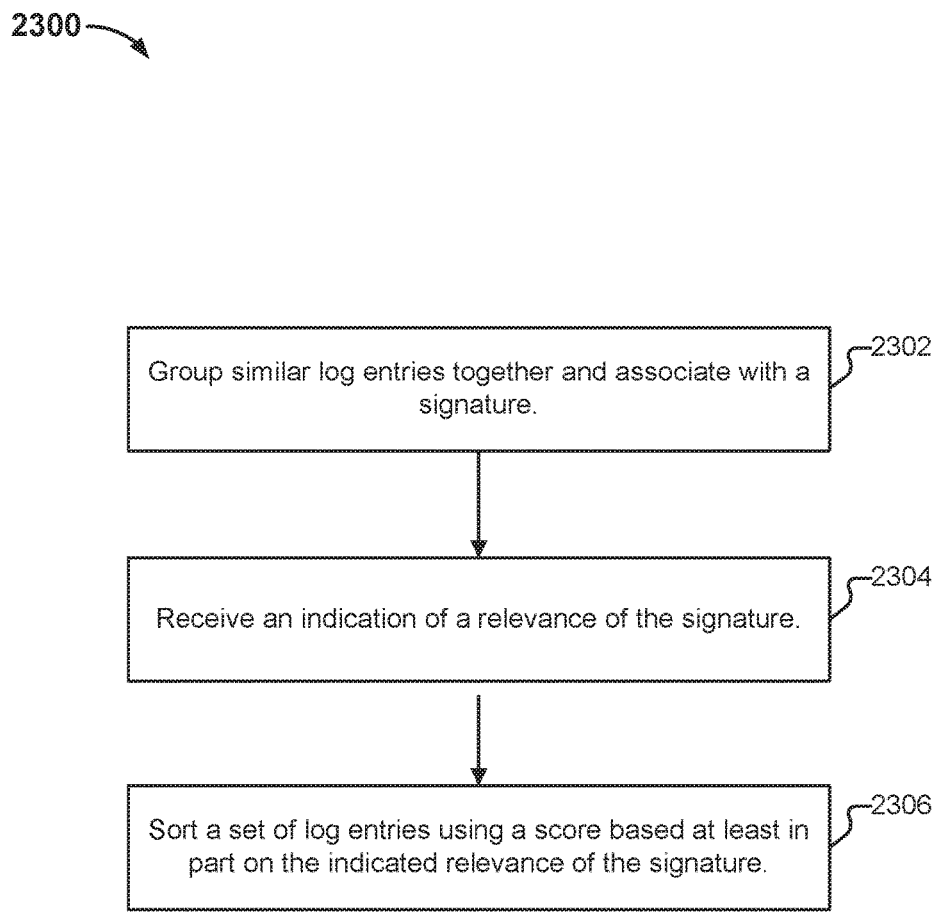
FIG. 23 illustrates an embodiment of a process for indicating a relevance of a log entry.

FIG. 23 illustrates an embodiment of a process for indicating a relevance of a log entry. In some embodiments, process 2300 is performed by platform 1502. The process begins at 2302 when a group of similar log entries included in a set of log entries is grouped together and associated with a signature. As one example, suppose Tom performs a query that results in the results depicted in FIG. 22A. Tom's query can be performed in a variety of ways. As a first example, Tom could perform a new search. As a second example, Tom could run a saved search (e.g., identified using a query identifier stored in database 1528). Tom is presented with results similar to those shown in FIG. 18, and then clicks on Summarize tab 1814 and is presented with an interface such as is shown in FIG. 22A. Similar log entries are grouped together and associated with a signature (e.g., the 36 log entries matching signature 2228) at 2302.

At 2304, an indication of a relevance of the signature is received. As one example, when Tom clicks on the thumb up button appearing on line 2216, an indication of positive relevance is received at 2304. As another example, if Tom clicks on the thumb down button, an indication of negative relevance is received at 2304. As explained above, the relevance indication is received in a context. The context can be defined using a variety of parameters, such as which user performed the query, the organization to which the user belongs, and the query itself. Also as explained above, information pertaining to the query, its context, and the relevance information (e.g., provided by Tom or other users) can be stored in database 1528 and used in a variety of ways.

Finally, at 2306, at least a portion of log entries included in a set of log entries is sorted in accordance with a relevance score based at least in part on the indicated relevance. As one example, after Tom clicks the thumb up button appearing on line 2216, a score of 10 is assigned to the signature appearing on line 2216. Since the signature's relevance score (10) is now higher than all other signatures, it is depicted at the top of his results (as shown in FIG. 22B). As another example, after Tom clicks a thumb down button (2224), the corresponding signature receives a relevance score of zero and is depicted at the bottom of the results (2226) or hidden entirely, as applicable. As another example of the processing performed at 2306, suppose Tom performs a query on Monday, performs the relevance rating interactions described in conjunction with FIGS. 22A-22C, and goes home (after saving the query). On Friday, he reruns the query. In some embodiments, Friday's results will be sorted in accordance with the relevance ratings he provided on Monday, at 2306. As another example of the processing performed at 2306, suppose Tom's relevance ratings are stored in database 1528 and that Tom has indicated that his insights can be shared with other users of platform 1502. Now suppose Alice performs a search that is similar to that performed by Tom. At 2306, Alice's results can be presented based on portions 2302 and 2304 of process 2300 having previously been completed in conjunction with Tom's data.

Anomaly Detection

Events which do not conform to an expected pattern (anomalies) can be detected through anomaly detection (also referred to as outlier detection). Anomalies often translate to critical and actionable insights that, depending on the application domain, are referred to as outliers, changes, deviations, surprises, intrusions, etc. Machine data (referred to herein interchangeably as log data) is data generated by applications, servers, infrastructure, mobile devices, web servers, etc. This data is generated by machines in order to communicate to humans or other machines what they are doing (e.g., activity), what the status of that activity is (e.g., errors, security issues, performance), and results of their activity (e.g., business metrics). Computing environments exist which contain thousands of machine data sources across servers, networks, and applications. Further, the data originates from products provided by a wide variety of vendors, which can run a variety of versions, and be geographically distributed. Further still, the data sources are constantly updated, upgraded, and replaced.

Using techniques described herein, anomalies are detected by embodiments of platform 102, which can leverage thousands of nodes to continuously and in real-time analyze customer log data for important changes and events. This can be done without requiring customers (or other users) to write queries or rules, to set thresholds, or to write and apply data parsers. As will be described in more detail below, as important changes/events are detected, they are presented to users for investigation and to add knowledge, such as naming/describing the anomaly, and supplying severity information. When similar anomalies are seen in future machine data, the existing insight can be applied—whether to the same user's data, or to a different user's data, so that the anomaly can be automatically classified and the knowledge previously provided by the user (or users) made available. As one example, suppose a particular application has six types of log data associated with it, and within those logs, entries matching particular signatures are routinely seen (with varying frequency). If log data not matching those routinely seen signatures suddenly appears, or if log data matching routinely seen signatures suddenly vanishes, such anomalies will be detected and surfaced to the user. The user can investigate the anomaly (e.g., to assign it a name and description and to classify it as severe). If a similar spike in uncommonly seen log data or decline in commonly seen log data occurs in the future, the future event can be automatically classified as the same kind of anomaly and automatically accorded the name/description/severity information previously supplied by the user. And, any appropriate actions in accordance with the automatic classification can be taken (such as sending an email alert when a "severe" event occurs, or ignoring any occurrences of events graded as "low").

Figure 24:
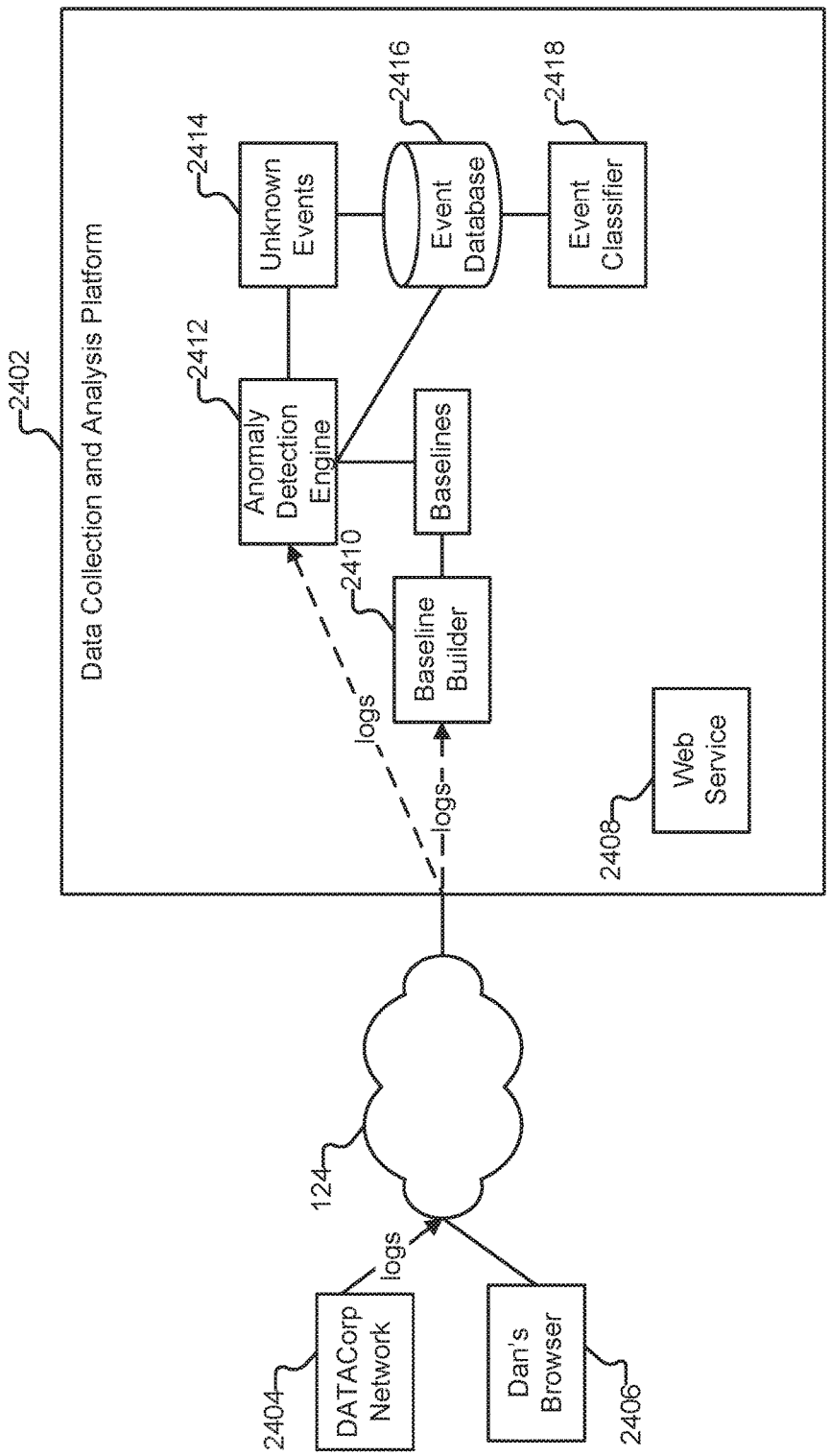
FIG. 24 illustrates an environment in which anomalies are detected.

FIG. 24 illustrates an environment in which anomalies are detected. In the example shown, platform 2402 is an embodiment of platform 102. One customer of platform 2402 as shown in FIG. 24 is "DATACorp" (2404), a company that makes an online banking application. As will be described in more detail below, an administrator employed by DATACorp (hereinafter referred to as "Dan") can use platform 2402 to monitor the banking application (and any associated infrastructure) and be alerted to problems with the application by platform 2402—without Dan knowing (or defining in advance) what sort of problems are of concern to him. For example, suppose DATACorp's banking application is discussed on national television Monday morning at 10 am. Hundreds of thousands of new users might all attempt to sign up for new accounts with the banking application at 10:05 am—far more than have ever tried to sign up before—resulting in various infrastructure being overloaded. Using the techniques described herein, and as described in more detail below, Dan can be alerted to problems arising from the overloaded infrastructure, without having to know in advance what particular problem he should be alerted to, and without having to write (or know how to write) custom queries that look for those particular problems. As one example, suppose that at 10:05 am, logs for the banking application start including hundreds of entries indicating a database call timeout (where usually there are very few, if any such entries). Using techniques described herein, the sudden occurrence of those entries is identified as anomalous and surfaced to Dan (e.g., to investigate). As another example, suppose the banking application uses a third party cloud hosting provider with a very high availability (i.e., the third party cloud hosting provider is very reliable and almost never has outages). In the rare event the hosting provider has an outage, Dan can be alerted to anomalous logs, without having to know in advance how to look out for outages at the hosting provider.

Dan can also share knowledge about anomalies the DATACorp system encounters with other DATACorp administrators, and with administrators at other companies (e.g., Alice and Bob) as well (if desired). Similarly, Dan can benefit from other users of platform 2402 providing insight on detected anomalies. As one example, suppose logs for DATACorp's banking application suddenly include hundreds of entries of the form (and thus matching a signature) "Cannot update a counter $number," where $number varies. Dan may have no idea what this anomaly (flagged by platform 2402 when it occurs in DATACorp's logs) means. A different user of platform 2402, "Eddie," (whether another DATACorp employee, or working for an entirely different customer) knows that this error means that an ESX server is unable to resolve a hostname. Eddie can provide information about the anomaly (e.g., because he encountered it in his own data, or because he consulted with Dan) and his insights can be saved (e.g., in event database 2416) and used to annotate future occurrences of the event. Thus, for example, if three days after "Cannot update a counter $number" appeared in DATACorp's log data for a brief window, the error appears again, platform 2402 will automatically annotate the event as "ESX server is unable to resolve a hostname" and accord the event the severity previously provided (e.g., by Eddie as editable by Dan).

Returning to FIG. 24, in some embodiments Dan begins using platform 2402's anomaly detection capabilities by configuring DATACorp's banking application to transmit log data to platform 2402, which ingests the data (e.g., in accordance with techniques described above). Log data from other DATACorp infrastructure can also be provided to platform 2402, such as log data from database infrastructure or backend server infrastructure. Platform 2402 builds a baseline for the banking application using baseline builder 2410. The baseline represents the typical quantity, and type of log information typically received over a period of time for the application (e.g., as determined by profiling a stream of log data using signatures described above). Deviations from the baseline (e.g., differing from the baseline by more than a threshold amount) are flagged by platform 2402 as anomalies.

Figures 25A, 25B:
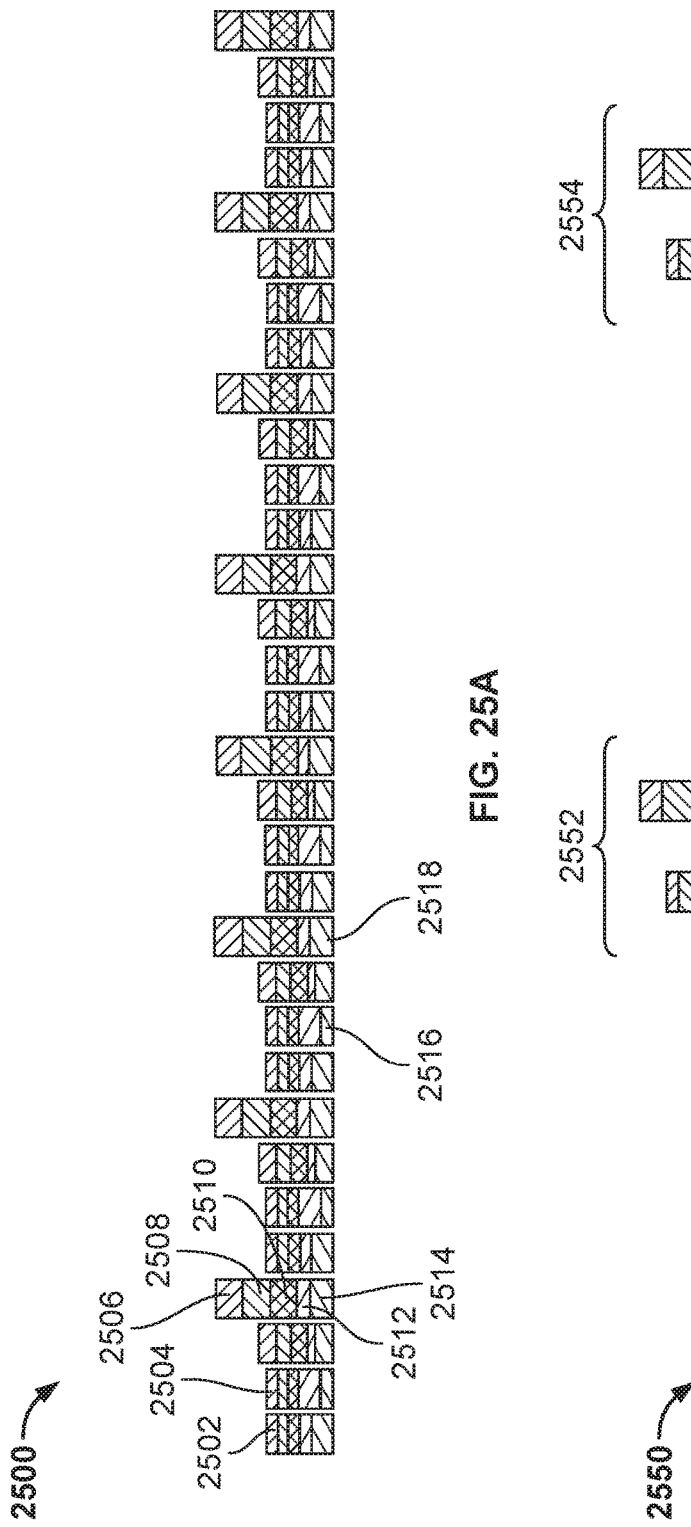
FIG. 25A illustrates a representation of a baseline.
FIG. 25B illustrates a representation of a portion of received log data.

A representation of a baseline is shown in FIG. 25A. In the example shown in FIG. 25A, each bar (e.g., bar 2502 or bar 2504) represents a normalization of approximately one minute's worth of log data received from the banking application. One example of baseline creation is for platform 2402 to aggregate a set of thirty minute snapshots of log data (e.g., 48 total slices taken over the course of 24 hours). In this approach, the signatures corresponding to the log data are determined for each of the 48 snapshots, along with counts of log lines for each of those signatures (e.g., in accordance with techniques described above). The counts for signatures can then be aggregated (e.g., an average taken across all snapshots) to build the baseline. Stated another way, a histogram of matched signatures is determined for the application, for each unit of granularity (e.g., one minute) across the entire time period being used for the baseline creation (e.g., one day). In various embodiments, normalization or other techniques are used to refine the histogram.

Other approaches can also be used to build baselines. For example, a single baseline can be built for the application on demand (e.g., using 24 hours of data), with the average signature profile (i.e., the identity and count of signatures matched by log lines) being taken across the 24 hour data. The baseline can similarly be rebuilt on demand. As another example, the baseline can be continuously computed based on a decay (whether exponential, linear, or otherwise), with those snapshots of data more recently observed weighted higher than older snapshots. Further, in addition to using the counts of signatures in the baseline, the values appearing in the variable portions of the printf statement can also be considered in a baseline. So, for example, if the application typically sees "time to complete $time" as having values between 10 and 200 ms (and included in the baseline accordingly), values outside of that range can be considered anomalous. Further, instead of having a single baseline, multiple baselines can be used (e.g., segmented based on time of day, day of week, time of year, etc.). Thus, for example, one baseline of the banking application can be created for how the application typically behaves in "off hours" (e.g., nights and weekends) and another baseline of the banking application can be created for how the application typically behaves during traditional work week hours.

Within each bar is the distribution of log data for that time slice. In the example shown in FIG. 25A, the log data received from the application includes five types of log data (2506-2514). As shown in baseline 2500, approximately every four minutes log types 2506, 2508, 5210, and 5214 emit more entries than they do during the rest of the time (i.e., have a larger volume than otherwise). Log type 2512 also emits more entries approximately every four minutes than it otherwise does, but those increases are offset in time from the other logs', as seen by comparing the distribution in bar 2516 to that in 2518. Also as shown in baseline 2500, log types 2506-2510 tend to have the same volume as one another throughout each portion of the baseline, while types 2512 and 2514 vary in volume as compared to types 2506-2510.

A representation of the last fifteen minutes' of log data received from the banking application is shown in FIG. 25B. An anomaly can be seen at time 2552. As explained above, log types 2506-2510 typically grow and shrink in volume in tandem. At time 2552, however, log type 2510 has significantly more volume than log type 2508, which in turn has more volume than log type 2506. Anomaly detection engine 2412 detects that the log data received from the banking application has deviated from the baseline by more than a threshold amount (e.g., by comparing the real time stream of log data received from the banking application to a stored representation of baseline 2500). In this example, suppose the anomaly is one that platform 2402 has not previously encountered. The anomaly is flagged by platform 2402 for review by Dan, who will be asked to investigate the anomaly and provide information about the anomaly (e.g., by interacting with an event viewer interface made available to Dan's browser 2406 via web service 2408). As one example, suppose at time 2552, the banking application is unable to communicate with a backend database. Dan can supply a description of the anomaly (e.g., "application can't talk to database"), a severity of the anomaly (e.g., "severe" or "low"), etc. A representation of the anomaly and Dan's provided information is stored in event database 2416 as an event object (also referred to herein as a user-event definition). Later, if a similar event occurs (e.g., at time 2554), platform 2402 can automatically flag the event as being an "application can't talk to database event" and take appropriate action (e.g., based on the severity provided by Dan). Additional actions can be taken with respect to event objects stored in event database 2416. For example, Dan can browse events in the event database 2416, can edit events (e.g., if they were added by him or if he is otherwise authorized to modify the event objects), and can search for occurrences of particular events in his data, all by Dan interacting with web service 2408 via his browser 2406. Further, as explained above, various privacy controls can be applied to data such as the events stored in event database 2416, allowing a single customer to share access to event objects across its employees, and also allowing multiple customers to pool their knowledge (e.g., by making events readable—whether globally or to designated others).

As another example of anomaly detection that can be performed by platform 2402, suppose updates to the banking application are performed between two and three in the morning a few times a week. When initially building a profile for the application, platform 2402 might flag an update event as an anomaly. When Dan reviews the event, Dan indicates that it is a routine deploy event. If a deploy event occurs between two and three in the morning, platform 2402 can treat the event as routine. If, however, the deploy event occurs at a significantly different time (e.g., at noon), Dan can be alerted that the deploy event has occurred at an anomalous time.

Figure 26:
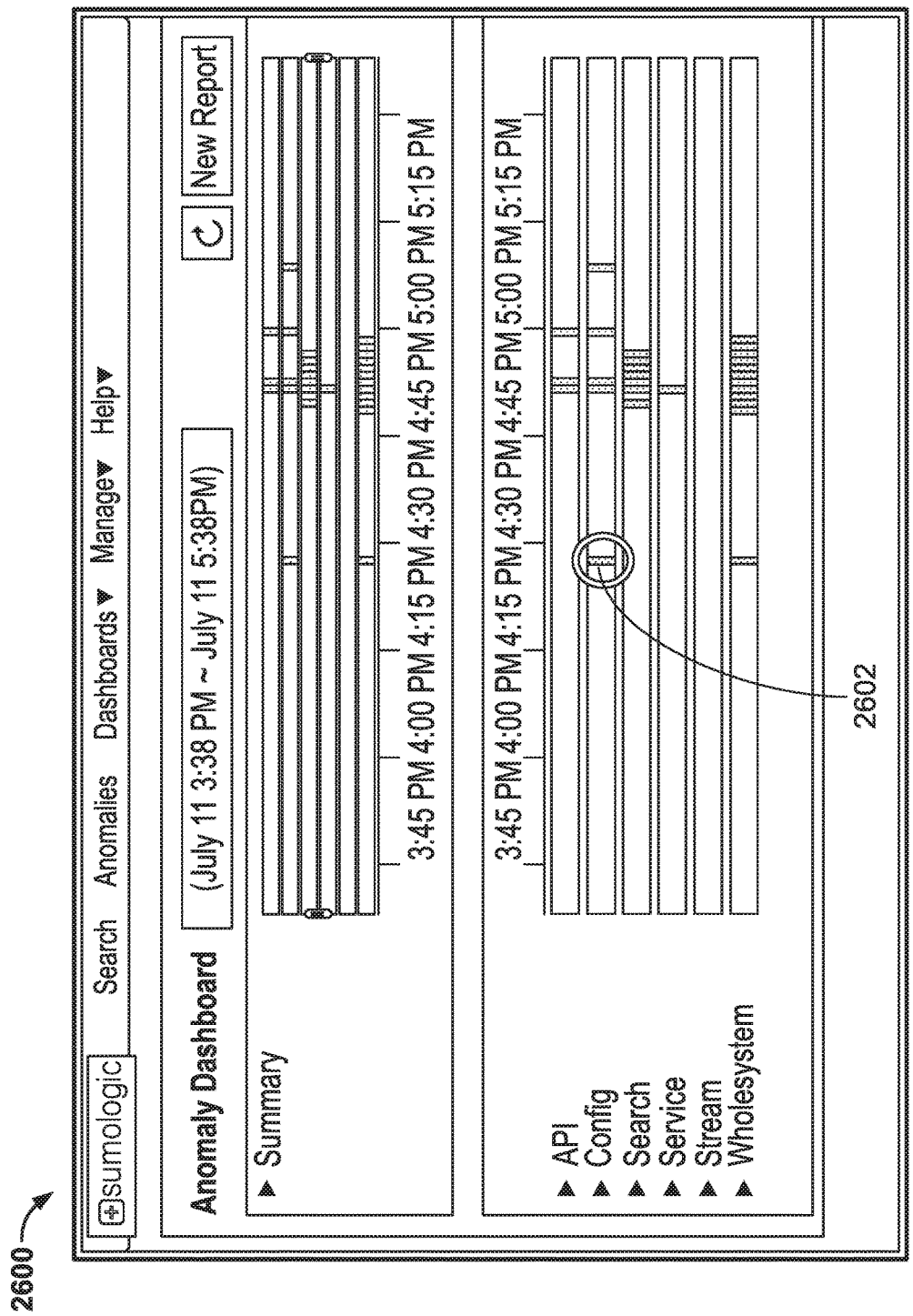
FIG. 26 illustrates an embodiment of an anomaly dashboard interface as rendered in a browser.

FIG. 26 illustrates an embodiment of an anomaly dashboard interface as rendered in a browser. In the example shown, Dan has logged into a web interface provided by platform 2402 (web service 2408). Web service 2408 is an embodiment of web service 126 as shown in FIG. 1. As shown in FIG. 26, Dan is viewing a representation of anomalies detected by platform 2402 (with respect to DATACorp services) over a two hour period. An example of a representation of an anomaly is depicted in interface 2600 as a box on the timeline (e.g., box 2602). In interface 2600, unknown events (i.e., those for which a user such as Dan has not yet provided definition information) are depicted in a default color (e.g., blue), such as event 2414. Suppose the event represented by box 2602 is an unknown event. Dan can click on box 2602 and be presented with an interface that will allow him to provide knowledge about the event, such as naming/describing the event, and providing a severity for it. Examples of severity include: high (e.g., a critical problem needing immediate attention), medium (e.g., a problem requiring attention, but can be handled during normal business hours), low (e.g., a problem potentially requiring little or no attention), and ignore (e.g., not a problem at all). Additional options can also be included, such as allowing Dan to flag the event as something to "add to the baseline." As one example, a change in the code base of the banking application may have resulted in changes to printf statements. When log entries created using those new printf statements are first encountered by platform 2402, their presence could be flagged as anomalous. Dan can indicate to platform 2402 that the newly encountered printf statements should be added to the baseline (e.g., causing platform 2402 to revise the baseline for the application). Further, as mentioned above, in some embodiments, if Dan does not know what caused the anomaly (or is otherwise unable to supply information about the anomaly) he can request help (whether from another DATACorp employee, another customer of platform 2402, or an employee of platform 2402 as applicable). In some embodiments, the helper (e.g., once approved by Dan) is able to view Dan's data and propose information to be included about the event (or, in some embodiments, to directly edit the information).

FIG. 27 illustrates an embodiment of an anomaly dashboard interface as rendered in a browser. In this example, Dan is shown interface 2700 after having clicked on box 2602 of FIG. 26. In region 2702 of interface 2700, Dan is shown detailed information about the signatures applicable to the portion of logs received during the time period covered by box 2602. Column 2712 indicates the number of lines matching a given signature and how the logs included in the present event are different from the baseline. Here, where the current event includes log lines not present in the baseline, the label "new" appears (2718); where the current event is missing log lines that are present in the baseline, the label "gone" appears (2720); where the count of log lines differs between the current event and the baseline, that difference is indicated (2722). Column 2718 indicates how "surprising" the difference is. In the example of FIG. 27, a significant number of log lines (270 total) matching a signature (2714) that is not present in the baseline were observed by platform 2402. This significant difference from the baseline is indicated in region 2716 with a large score indicator. Other differences from the baseline are less significant (e.g., where the count of log lines matching a signature in the baseline and as observed during the event are within a threshold).

In region 2704 of interface 2700, Dan can supply information about the event, such as by giving it a name (2706), a description (2708), and assigning it a severity (2710). In this example, Dan has reviewed (in region 2724) some of the 270 individual log lines matching signature 2714. He has concluded that the messages involved a cache being cleaned up, and that the event was of low (or no) severity, by picking "low" from the dropdown in region 2710.

Figure 28:
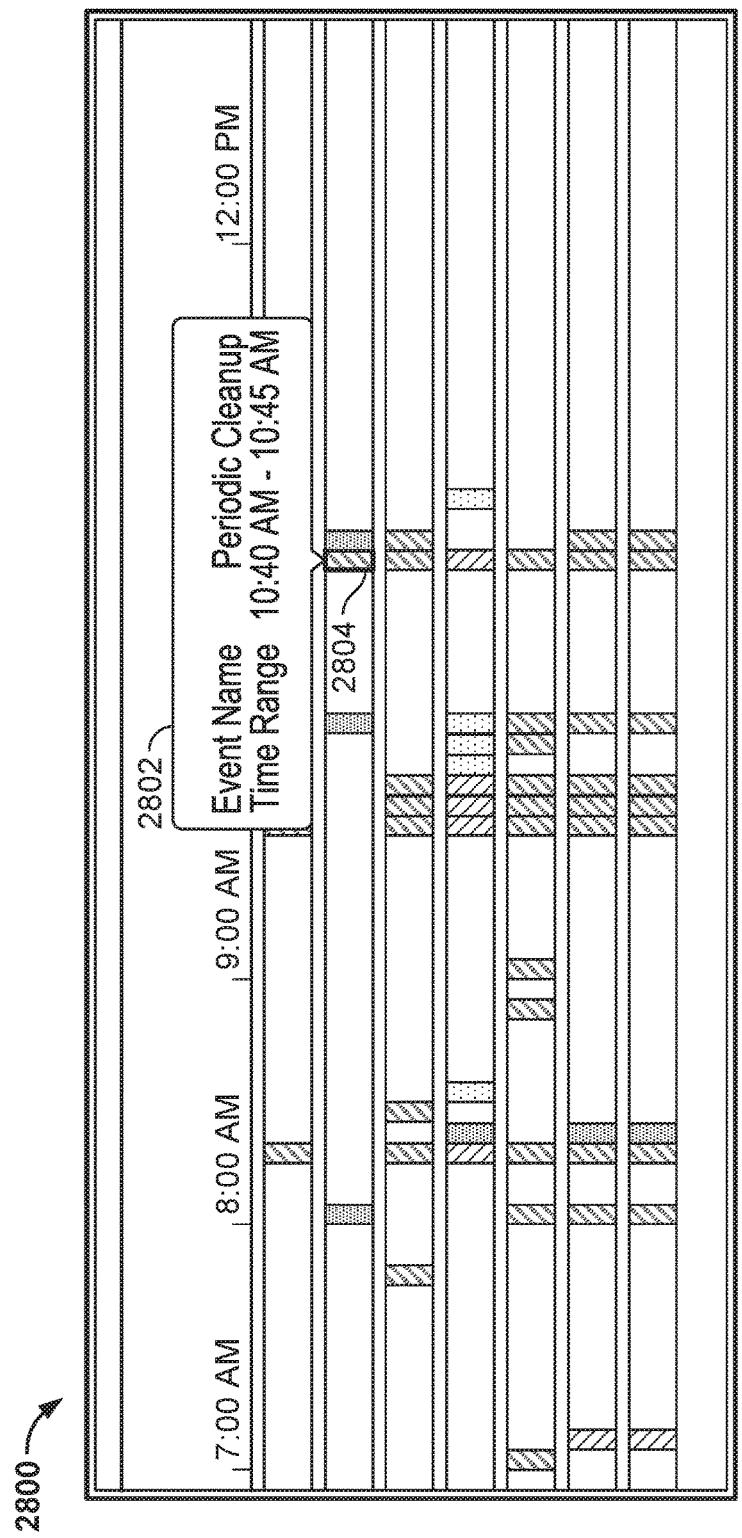
FIG. 28 illustrates a portion of an embodiment of an anomaly dashboard interface as rendered in a browser.

FIG. 28 illustrates a portion of an embodiment of an anomaly dashboard interface as rendered in a browser. In this example, Dan is shown interface 2800 at a time after having clicked on various segments depicted in FIG. 26 (e.g., 2602) and having supplied knowledge about those events (i.e., changing unclassified events into classified ones). Those events classified as low severity are shown in green (instead of the default blue), those of medium severity are shown in yellow, and those of high severity are shown in red, by event classifier 2418, which is responsible for depicting anomalous events in interfaces such as interface 2800. Further, if Dan hovers his mouse over one of the classified events, he will be shown a short summary about the event (e.g., summary 2802 shown when Dan hovers his mouse over region 2804). In some embodiments, Dan can choose to hide low (or no) severity events, rather than being shown the events in green.

Figure 29:
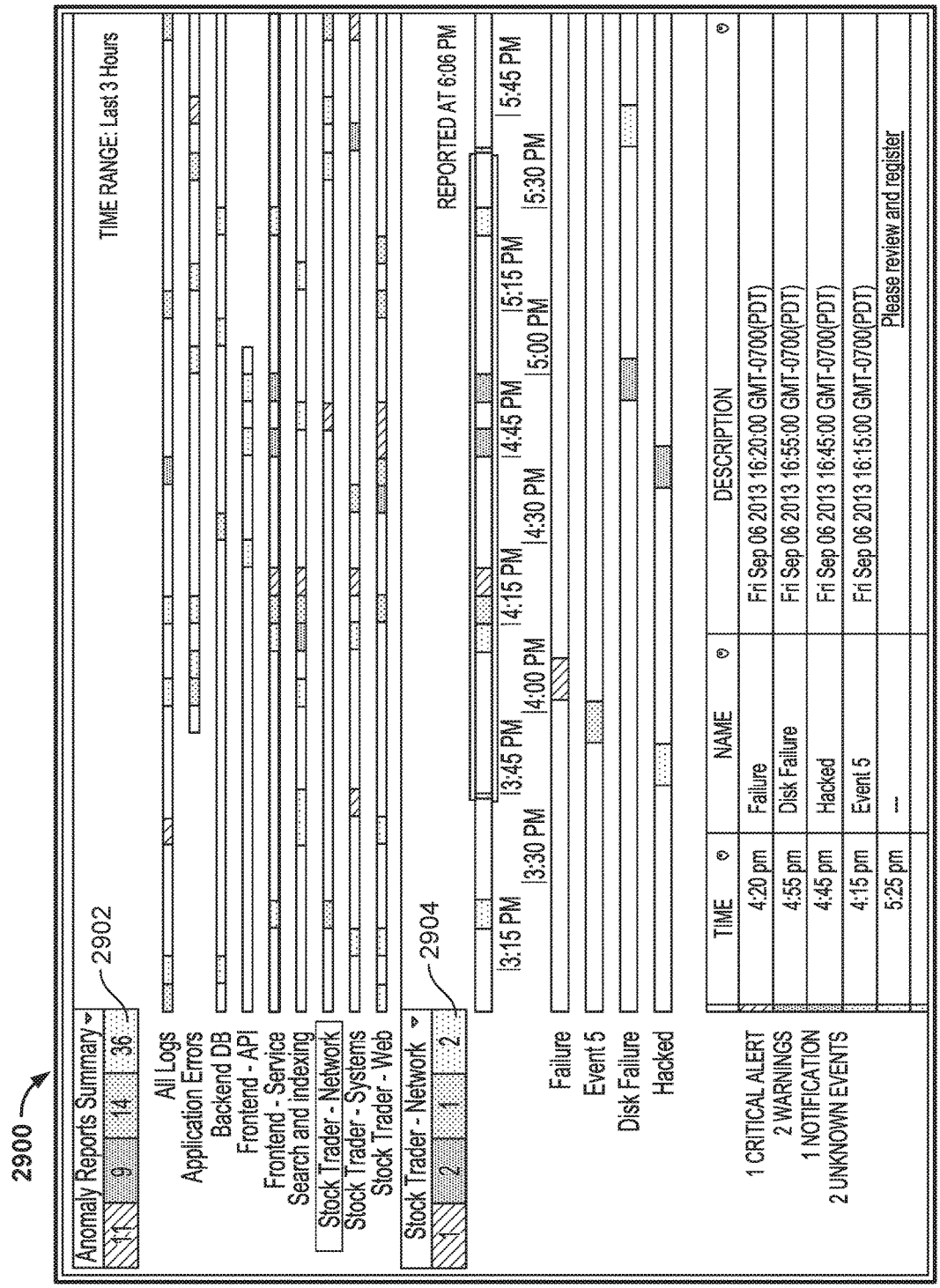
FIG. 29 illustrates an embodiment of an anomaly dashboard interface as rendered in a browser.

FIG. 29 illustrates an embodiment of an anomaly dashboard interface as rendered in a browser. Interface 2900 is an alternate version of interface 2600. In region 2902, a summary of anomalies detected across all of DATACorp's logs in the last three hours is shown. In region 2904, just those anomalies associated with network conditions of a stock trading application are shown. In both regions, the summaries are broken out into high, medium, and low severity events, as well as unknown events. In various embodiments, platform 2402 includes an alerting engine, which is configured to take various alerting actions when anomalous events are encountered. For example, any time an event having a red (severe) classification is observed by platform 2402 in a customer's log data stream, an administrator (e.g., of the customer) can be automatically emailed or otherwise alerted by platform 2402 to investigate.

Figure 30:
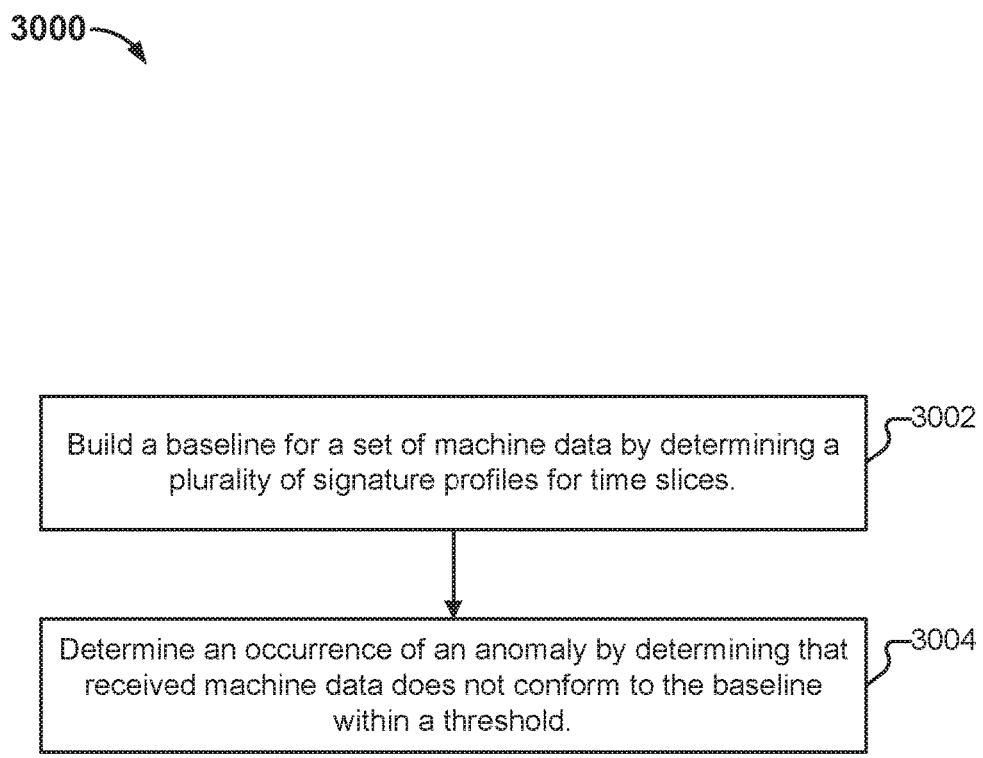
FIG. 30 illustrates an embodiment of a process for detecting an anomaly.

FIG. 30 illustrates an embodiment of a process for detecting an anomaly. In some embodiments, process 3000 is performed by platform 2402. The process begins at 3002 when a baseline for a set of machine data is built. As explained above, the baseline can be built in a variety of ways. As one example, for a plurality of time slices included in a time range, respective signature profiles for a data source (e.g., DATACorp's banking application) can be determined and combined. At 3004, an occurrence of an anomaly (e.g., in a stream of log data received from the banking application) is determined by determining that received machine data does not conform to the baseline. A variety of techniques can be used to determine that the received machine data does not conform to the baseline. As one example, platform 2402 can perform a continuous query, in which the most recent one minute's worth of machine data received from the application is retrieved for processing. That minute's worth of data is profiled (e.g., a signature histogram is determined as described above) and compared against the baseline. A threshold can be applied in determining whether the current data is sufficiently outside the baseline to warrant the detection of an anomaly. Thus for example, if two items matching a particular signature are typically expected (according to the baseline) and three are seen, or zero are seen, such differences are not significantly different from the baseline. Alternatively, if 1000 such items are seen, this is significantly different from what would be expected to be seen based on the baseline. One way to perform such a comparison is to compute a difference score for the number of entries for each signature included in the baseline and in the current data. The scores for each individual signature can then be aggregated and a threshold applied.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      build a baseline for a set of machine data at least in part by determining a plurality of signature profiles for a plurality of respective time slices, wherein determining a signature profile for a given time slice included in the plurality of time slices comprises determining a distribution of signatures to which machine data for the given time slice matches;
      determine an occurrence of an anomaly associated with a source of the set of machine data at least in part by determining that received machine data does not conform to the baseline within a threshold;
      present the anomaly to a user via one or more interfaces;
      receive, from the user and via the one or more interfaces, information associated with the anomaly, wherein the information provided by the user comprises a severity of the anomaly;
      assign the severity provided by the user to the anomaly;
      store a representation of the anomaly and the information provided by the user as a first event;
      determine an occurrence of a subsequent anomaly;
      automatically classify the subsequent anomaly as a same type of anomaly as the first event;
      in response to automatically classifying the subsequent anomaly as the same type of anomaly as the first event, automatically annotate the subsequent anomaly with the severity previously provided by the user; and
      perform an action with respect to the subsequent anomaly based at least in part on the annotation of the subsequent anomaly with the severity previously provided by the user; and
   a memory coupled to the processor and configured to provide the processor with instructions.

2. The system of claim 1 wherein the processor is further configured to receive a set of signatures associated with an application.

3. The system of claim 2 wherein receiving the set of signatures includes determining the set of signatures at least in part by grouping a plurality of similar log entries included in a set of log entries together and associating those log entries included in the group with a signature usable to identify additional log entries which should be included in the group.

4. The system of claim 1 wherein a signature profile included in the plurality of signature profiles comprises a histogram of signatures.

5. The system of claim 1 wherein the processor is further configured to alert an administrator of the occurrence of the anomaly.

6. The system of claim 1 wherein the processor is further configured to cause the representation of the anomaly to be displayed to a first administrator.

7. The system of claim 6 wherein the first administrator is prompted to provide the severity of the anomaly and save the anomaly as the first event.

8. The system of claim 7 wherein the severity provided by the first administrator is editable by a second administrator.

9. The system of claim 7 wherein the first event is stored in an event repository, wherein the event repository is accessible by a first and second user, and wherein log data accessible to the first user and is not accessible to the second user can be classified using the event repository.

10. The system of claim 1 wherein the baseline is built using machine data received from a first data source and wherein the subsequent anomaly is present in additional machine data received from the first data source.

11. The system of claim 1 wherein the subsequent anomaly is present in machine data received from a different source of machine data than was used to build the baseline.

12. The system of claim 1 wherein the baseline is one of a plurality of segmented baselines and wherein the baseline is selected from the plurality of segmented baselines for use in detecting anomalies based at least in part on a current condition matching a condition associated with the selected baseline.

13. The system of claim 12 wherein the baseline and the condition share at least one of a common date and a common time.

14. A method, comprising:
   building a baseline for a set of machine data at least in part by determining a plurality of signature profiles for a plurality of respective time slices, wherein determining a signature profile for a given time slice included in the plurality of time slices comprises determining a distribution of signatures to which machine data for the given time slice matches;
   determining an occurrence of an anomaly associated with a source of the set of machine data at least in part by determining that received machine data does not conform to the baseline within a threshold;
   presenting the anomaly to a user via one or more interfaces;
   receiving, from the user and via the one or more interfaces, information associated with the anomaly, wherein the information provided by the user comprises a severity of the anomaly;
   assigning the severity provided by the user to the anomaly;
   storing a representation of the anomaly and the information provided by the user as a first event;
   determining an occurrence of a subsequent anomaly;
   automatically classifying the subsequent anomaly as a same type of anomaly as the first event;
   in response to automatically classifying the subsequent anomaly as the same type of anomaly as the first event, automatically annotating the subsequent anomaly with the severity previously provided by the user; and
   performing an action with respect to the subsequent anomaly based at least in part on the annotation of the subsequent anomaly with the severity previously provided by the user.

15. The method of claim 14 further comprising receiving a set of signatures associated with an application.

16. The method of claim 15 wherein receiving the set of signatures includes determining the set of signatures at least in part by grouping a plurality of similar log entries included in a set of log entries together and associating those log entries included in the group with a signature usable to identify additional log entries which should be included in the group.

17. The method of claim 14 wherein a signature profile included in the plurality of signature profiles comprises a histogram of signatures.

18. The method of claim 14 further comprising alerting an administrator of the occurrence of the anomaly.

19. The method of claim 14 further comprising causing the representation of the anomaly to be displayed to a first administrator.

20. The method of claim 19 wherein the first administrator is prompted to provide the severity of the anomaly and save the anomaly as the first event.

21. The method of claim 20 wherein the severity provided by the first administrator is editable by a second administrator.

22. The method of claim 20 wherein the first event is stored in an event repository, wherein the event repository is accessible by a first and second user, and wherein log data accessible to the first user and is not accessible to the second user can be classified using the event repository.

23. The method of claim 14 wherein the baseline is built using machine data received from a first data source and wherein the subsequent anomaly is present in additional machine data received from the first data source.

24. The method of claim 14 wherein the subsequent anomaly is present in machine data received from a different source of machine data than was used to build the baseline.

25. The method of claim 14 wherein the baseline is one of a plurality of segmented baselines and wherein the baseline is selected from the plurality of segmented baselines for use in detecting anomalies based at least in part on a current condition matching a condition associated with the selected baseline.

26. The method of claim 25 wherein the baseline and the condition share at least one of a common date and a common time.

27. A computer program product embodied in a tangible computer readable storage medium and comprising computer instructions for:
   building a baseline for a set of machine data at least in part by determining a plurality of signature profiles for a plurality of respective time slices, wherein determining a signature profile for a given time slice included in the plurality of time slices comprises determining a distribution of signatures to which machine data for the given time slice matches; and
   determining an occurrence of an anomaly associated with a source of the set of machine data at least in part by determining that received machine data does not conform to the baseline within a threshold;
   presenting the anomaly to a user via one or more interfaces;
   receiving, from the user and via the one or more interfaces, information associated with the anomaly, wherein the information provided by the user comprises a severity of the anomaly;
   assigning the severity provided by the user to the anomaly;
   storing a representation of the anomaly and the information provided by the user as a first event;
   determining an occurrence of a subsequent anomaly;
   automatically classifying the subsequent anomaly as a same type of anomaly as the first event;
   in response to automatically classifying the subsequent anomaly as the same type of anomaly as the first event, automatically annotating the subsequent anomaly with the severity previously provided by the user; and
   performing an action with respect to the subsequent anomaly based at least in part on the annotation of the subsequent anomaly with the severity previously provided by the user.

* * * * *